United States Patent
Castro Castro et al.

(10) Patent No.: US 8,824,340 B2
(45) Date of Patent: Sep. 2, 2014

(54) HANDLING OF POLICY AND CHARGING INFORMATION AND USER PROFILES IN A MULTISITE COMMUNICATION'S NETWORK

(75) Inventors: Fabian Castro Castro, Madrid (ES); Juan Pedro García Cervigón, Madrid (ES); Ana Maria Lopez Nieto, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 138 days.

(21) Appl. No.: 13/639,896

(22) PCT Filed: Apr. 14, 2010

(86) PCT No.: PCT/EP2010/054901
§ 371 (c)(1),
(2), (4) Date: Nov. 2, 2012

(87) PCT Pub. No.: WO2011/127974
PCT Pub. Date: Oct. 20, 2011

(65) Prior Publication Data
US 2013/0044645 A1  Feb. 21, 2013

(51) Int. Cl.
*H04L 12/16* (2006.01)
*H04L 12/28* (2006.01)
*G06F 7/00* (2006.01)
*H04L 12/14* (2006.01)

(52) U.S. Cl.
CPC .................. *H04L 12/1407* (2013.01)
USPC ................ 370/259; 370/395.1; 707/769

(58) Field of Classification Search
CPC ...... H04L 47/24; H04L 47/70; H04L 47/2491
USPC .......... 370/259, 395.1; 709/227–229; 707/769
See application file for complete search history.

(56) References Cited

U.S. PATENT DOCUMENTS

2008/0271113 A1 * 10/2008 Belling .............................. 726/1
2010/0223282 A1 *  9/2010 Lataste et al. ................. 707/769

FOREIGN PATENT DOCUMENTS

WO  2007090463 A1  8/2007
WO  2009050395 A1  4/2009

OTHER PUBLICATIONS

3rd Generation Partnership Project. "3rd Generation Partnership Project; Technical Specification Group Services and System Aspects; Policy and Charging Control Architecture (Release 9)." 3GPP TS 23.203 V9.4.0, Mar. 2010, Sophia Antipolis Valbonne, France.*

* cited by examiner

*Primary Examiner* — Afshawn Towfighi
(74) *Attorney, Agent, or Firm* — Coats & Bennett, PLLC

(57) ABSTRACT

It is provided a method for handling policy and charging information, PCI, relating to a user, wherein the method is carried out in a communications network comprising a first and a second site at least (S1, S2). Each of these sites comprises at least a policy and charging rules, PCR, network entity. The method comprises sending (SI1O) from a first network entity of a first site (110; AF-1; PCEF-1) to a PCR network entity of said first site (PCRF-1) a request to obtain PCI dependent on a user profile; generating—if it is determined that said user profile is not accessible at the first site (PCRF-1)—a redirection message comprising an identity of the PCR network entity of the first site (PCRF-1); forwarding said redirection message to a PCR network entity of said second site (PCRF-2).

20 Claims, 14 Drawing Sheets

HANDLING OF POLICY AND CHARGING INFORMATION AND USER PROFILES IN A MULTISITE COMMUNICATION'S NETWORK

TECHNICAL FIELD

The present invention relates to a method for handling policy and charging information carried out in a communications network comprising at least a first site and a second site. The invention also relates to a policy and charging rules network entity for forwarding request messages to other sites in a communications network comprising at least a first site and a second site; to a PCR network entity for handling policy and charging information PCR and for forwarding a message to a network entity of another site; to a system for handling policy and charging information in a communications network comprising at least a first and second site and to a computer program for handling policy and charging information.

BACKGROUND

In communication networks, such as telecommunication networks, a call or a service often involves, on the one hand, a control plane or signalling plane and, on the other hand, a user plane. The control plane or signalling plane is in charge of establishing and managing a connection between two points on the network. The user plane or media plane is in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules which may be user-specific, a policy decision element, function or point, and a policy enforcement element, function or point. The purposes of a policy framework include controlling subscriber access to the networks and services.

A policy framework notably addresses the decisions as to whether the subscriber is entitled, or authorized, to enjoy a service, and whether the network can provide the service to the subscriber.

Policy and charging control architectures, such as, but not limited to, the architecture described in 3GPP TS 23.203, Technical Specification Group Services and System Aspects, Policy and charging control architecture (Release 8) (available on http://www.3gpp.org), integrate the policy and charging control.

Policy and Charging Control (PCC) architecture permits to integrate both policy and charging control, optimizing the information flow. The architecture that supports Policy and Charging Control functionality is shown in FIG. 1 and is in accordance with TS 23.203, which specifies the PCC functionality for Evolved 3GPP Packet Switched domain, including both 3GPP accesses (GERAN/UTRAN/E-UTRAN) and Non-3 GPP accesses. In the following, an explanation of the main elements of such architecture will be provided.

The Application Function (AF) is an element offering applications in which service is delivered in a different layer (i.e. transport layer) from the one the service has been requested (i.e. signaling layer), the control of IP bearer resources according to what has been negotiated. One example of an AF is the P-CSCF of the IM CN subsystem. The AF shall communicate with the PCRF to transfer dynamic session information (i.e. description of the media to be delivered in the transport layer). This communication is performed using the Rx interface. The information in the Rx interface is derived from the session information in the P-CSCF (e.g. SDP when SIP is used for signalling) and it mainly includes what is called media components. A media component is composed by a set of IP flows, each one described through a 5-tuple, the media type and bandwidth required.

The PCRF is the function that provides policy and charging control for the Media Components negotiated between the UE and the AF. For that purpose, the PCRF creates PCC rules based on the information received from the Rx interface. PCRF, depending on the user and the requested service, include charging and policy information along with the a set of IP filter information: each IP 5-tuple is composed of src and destination IP address and ports, and the protocol id above IP (TOP, UDP). The filters included in PCC rules define what is called Service Data Flows (SDF), i.e. data flows that are treated in the same way regarding policy and charging. This Service Data. Flows are installed in PCEF through the Gx interface.

The PCEF encompasses service data flow detection (based on the filters definitions included in the PCC rules), as well as online and offline charging interactions (not described here) and policy enforcement. Since the PCEF is the one handling the bearers, this is where the QoS is being enforced for the bearer according to the QoS information coming from the PCRF. This functional entity is located at the Gateway (e.g. GGSN in the GPRS case, and PDG in the WLAN case).

In the PCC architecture, the policy control includes the QoS control. The PCEF enforces the authorized QoS for an IP-CAN bearer according to the information received via the Gx interface and depending on the bearer establishment mode. The enforcement of the authorized QoS of the IP-CAN bearer may lead to a downgrading or upgrading of the requested bearer QoS by the PCEF as part of a UE-initiated IP-CAN bearer establishment or modification. Alternatively, the enforcement of the authorised QoS may, depending on operator policy and network capabilities, lead to network initiated IP-CAN bearer establishment or modification. If the PCRF provides authorized QoS for both, the IP-CAN bearer and PCC rule(s), the enforcement of authorized QoS of the individual PCC rules shall take place first.

At IP-CAN session establishment or modification, the PCEF requests the policy rules to the PCRF. In the case that due to the size of the network, several PCRFs are deployed in different sites, the standard defines the DRA functional entity.

The DRA functional entity is defined in the 3GPP standards for PCRF discovery procedures where more than one PCRF is present in an operator's network. It proposes to use Diameter routing procedures using the NAI domain part. This solution assumes that the operator deployment uses one realm per site and that the NAI is used in the network.

Routing of Diameter messages from a network element towards the right Diameter realm in a PLMN is based on standard Diameter realm-based routing, as specified in IETF RFC 3588 using the UE-NAT domain part.

The DRA is defined in 3GPP to support the functionality of a proxy agent and a redirect agent as defined in RFC 3588.

Big operators offering services within large sized countries or having operations in several countries often divide their network in several sites. Each site is made up of the resources as a complete network, i.e. those types of network element and applications needed to provide the required services or at least one service. Each site provides service for the subscribers located as home or as visitor in the geographical area assigned to the site. The networks distributed in several sites are known as multi-site networks. The user identity used in the operator network is typically the MSISDN for traffic purposes; although in some cases may also be the IMSI or the NAI.

In this multi-site scenario, each PCRF contains subscription information of only the home subscribers. When a user is in a visited site, the control information relating to the traffic is routed through the visited PCEF. The visited PCEF routes the control information to the visited PCRF. As the visited PCRF does not have the subscription information of the visitor users, the PCRF needs to find the PCRF where the subscription information is stored. The solution proposed in the standard is based on the Diameter routing based on the realm, but this solution requires that the NAI is used; it is not valid when other types of subscriber identities are used, such is MSISDN. In addition it imposes requirements in the deployment of the network, i.e. one realm per each site, which is not always the case.

It is therefore desirable to provide methods, network entities, system and computer programs improving policy and charging control architectures and implementations in particular in multi site networks.

SUMMARY OF THE INVENTION

The object is achieved by the subject-matter of the independent claims. Advantageous embodiments are defined in the dependent claims. Further examples are provided for facilitating the understanding of the invention.

According to a first aspect of the invention, it is provided a method for handling policy and charging information relating to a user, the method carried out in a communications network comprising at least a first site (S1) and a second site (S2), wherein each of the first site and second site comprise at least a policy and charging rules, PCR, network entity (PCRF-1, PCRF-2). The method comprises the steps of:

sending (S110) from a first network entity of a first site (110; AF-1; PCEF-1) to a PCR network entity of the first site (PCRF-1) a request to obtain policy and charging information, the policy and charging information dependent on a user profile of a user accessing the communications network from the first site;

if it is determined that said user profile is not accessible at the PCR network entity of the first site (PCRF-1), generating a redirection message on the basis of the request, said redirection message comprising an identity of the PCR network entity of said first site (PCRF-1);

forwarding the redirection message to a PCR network entity of the second site (PCRF-2).

According to a second aspect of the invention, it is provided a policy and charging rules, PCR, network entity (400, PCRF-1) for handling policy and charging information relating to a user in a communications network comprising at least a first site (s1) and a second site (S2), the PCR network entity comprised in the first site. The PCR network entity comprises:

a request receiving entity (410) for receiving a request to obtain policy and charging information, the policy and charging information dependent on a user profile of a user accessing the communications network from said first site;

a determining entity (420) for determining a non-accessibility indication when the user profile is not directly accessible by said PCR network entity;

a generating entity (430) for generating, when the non-accessibility indication is determined, a redirection message on the basis of the request, the redirection message comprising an identity of the PCR network entity of the second site (PCRF-2);

a forwarding entity (440) for forwarding the redirection message to a PCR network entity of the second site (PCRF-2).

According to a third aspect of the invention, it is provided a policy and charging rules, PCR, network entity (500, PCRF-2) for handling policy and charging information relating to a user in a communications network comprising at least a first site (s1) and a second site (S2), the PCR network entity comprised in the second site. The PCR network entity comprises:

a request receiving entity (510) for receiving a request message relating to a user accessing the communications network from the first site, wherein the request message comprises at least an identity of one PCR network entity comprised in the first site;

a storage entity (520) for storing at least a user profile of the user;

a generating entity (530) for generating a message comprising an identity of the PCR network entity of the second site (PCRF-2);

a forwarding entity (540) for forwarding the message to a PCR network entity of the first site (PCRF-1).

According to a fourth aspect of the invention, it is provided a communications system for handling policy and charging information relating to a user in a communications network comprising at least a first site and a second site (S1, S2), the communications network comprising a PCR network entity included in the first site according to the second aspect of the invention, and a PRC network entity included in the second site according to the third aspect of the invention.

According to a fifth aspect of the invention, it is provided a computer program for handling policy and charging information relating to a user, the computer program comprising instructions configured, when executed on a programmable system, to cause the programmable system to carry out the method according to the first aspect of the invention.

DETAILED DESCRIPTION

The present invention shall now be described in conjunction with specific embodiments by making reference to the drawings. It is however noted that these specific embodiments as well as the illustrative figures serve to provide the skilled person with a better understanding of the invention but are not intended to restrict in anyway the scope of the invention which is defined by the independent claims.

Figure 2:
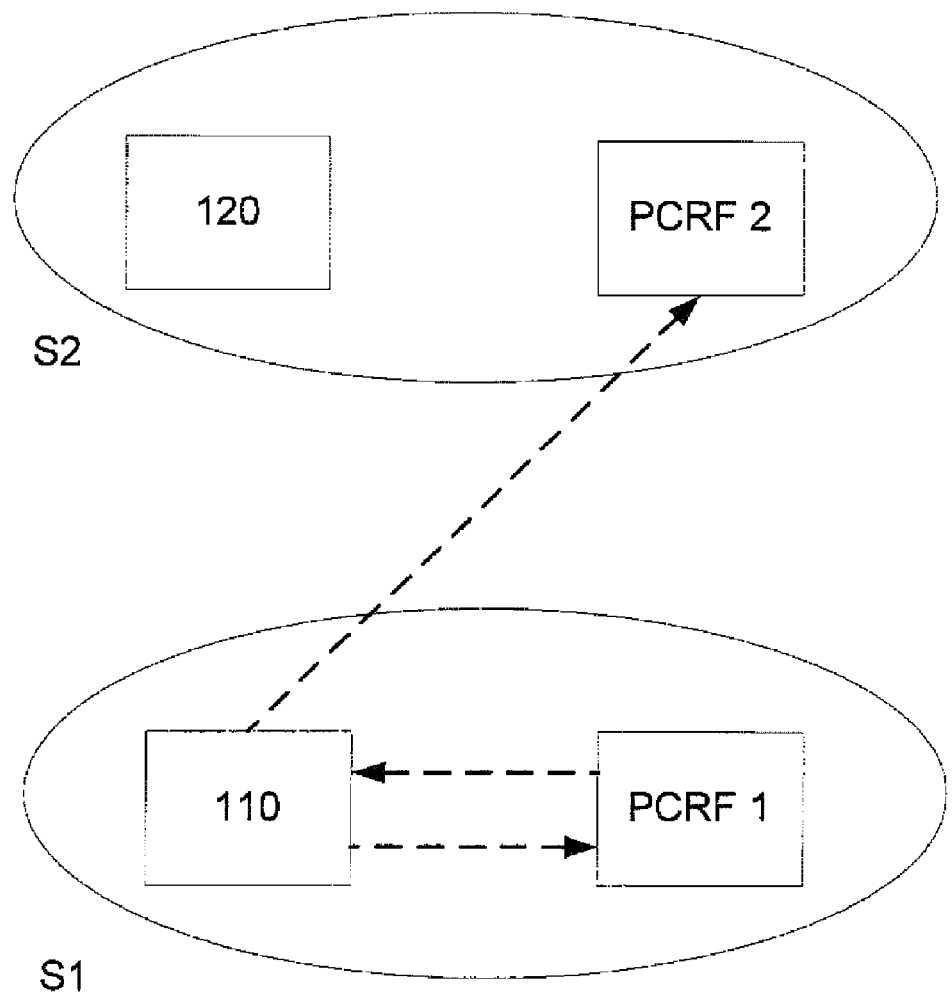
FIG. 2 illustrates an example of a communications network to which the present invention can be applied.

FIG. 2 represents an illustrative non restrictive example of a network architecture to which the present invention may be applied. As it can be seen, such communication network comprises at least two sites S1 and S2 wherein each site comprises those resources like network elements, devices or entities and applications needed for providing certain services to users. Therefore, a site can be seen as a complete network, wherein a complete network does not imply that all existing and possible network elements shall be included but at least the minimum number of network elements necessary for providing at least a given service to a user. Thus, a site in the present disclosure is intended a set comprising at least those network elements and/or applications necessary for providing at least one service to a user. Each of the sites S1 and S2 comprises a policy and charging rule entity PCRF-1 and PCRF-2. A PCR network entity like the ones depicted in FIG. 2 (PCRF-1 and PCRF-2) are network entities comprising means or specifically adapted components for providing policy and charging rules functionalities as above explained.

Site S1 also comprises a network entity comprising a policy enforcement function 110 capable of establishing communication with the PCR network entity PCRF-1 and with the PCR network entity PCRF-2. FIG. 2 illustrates also a policy enforcement function network entity 120 comprised in site S2 though the present invention would equally work without the entity 120. The policy enforcement network entity is a network element comprising a function for performing policy enforcement. As it will also be explained later, an example of such a network element is a PCEF, an AF or a BBERF.

Figure 3:
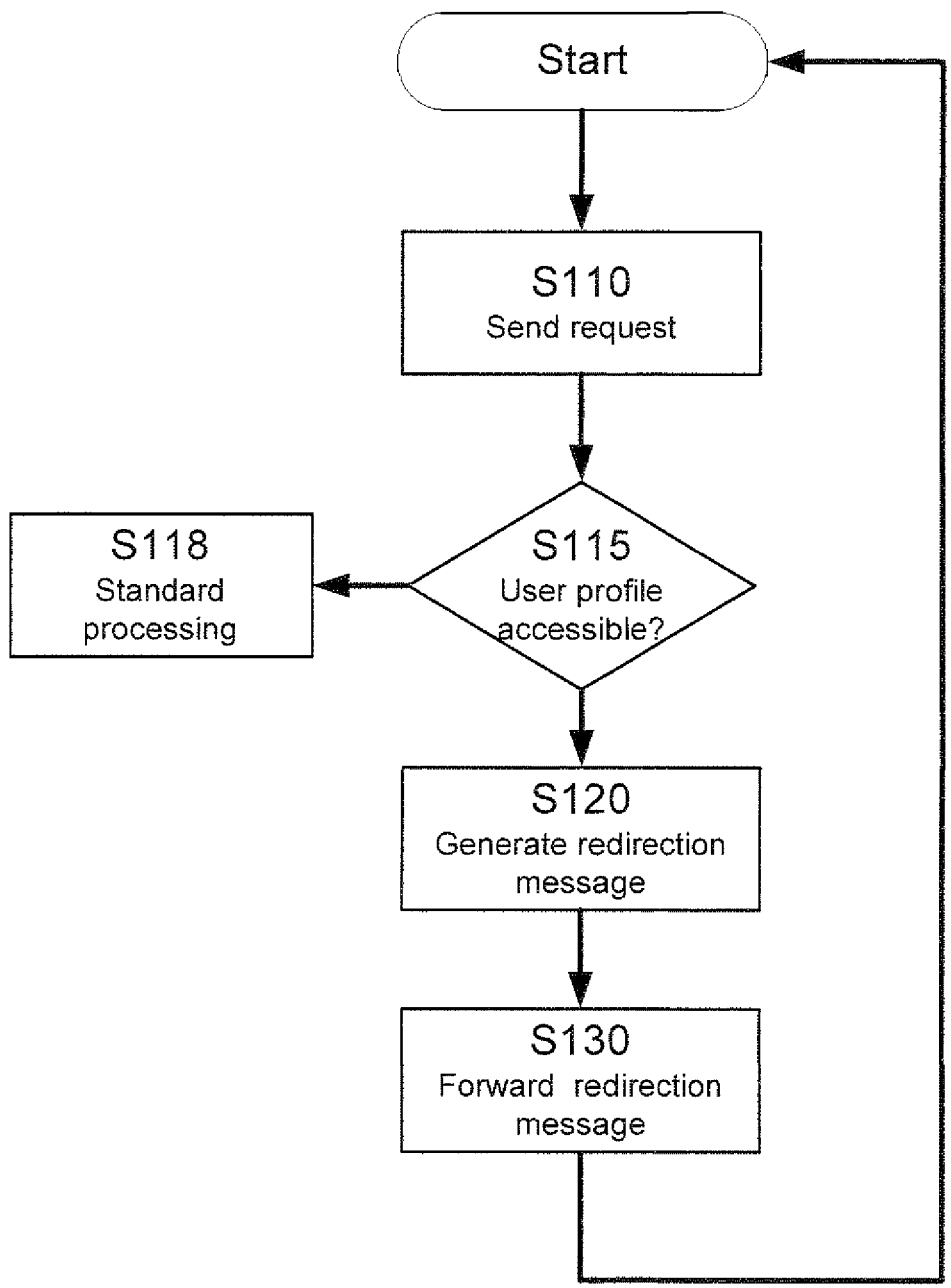
FIG. 3 illustrates a flow chart of a method according to an embodiment of the present invention.

A method according to a first embodiment of the present invention will now be described with reference to FIG. 3. The method according to the first embodiment is for handling policy and charging information relating to a user and is carried out in a communications network comprising at least a first site S1 and a second site S2. Each of the first site S1 and second site S2 comprises at least a policy and charging rules PCR network entity. In other words, the present method can be applied to a configuration of a communications network as depicted in FIG. 2 comprising two sites wherein each site comprises, respectively, network elements PCRF-1 and PCRF-2. For illustrative purposes FIG. 2 comprises further network elements (see 120) which are however not necessary for performing the method according to the present embodiment.

Each site is intended in the present disclosure as comprising a minimum set of network elements, devices and applications required for providing at least a service to at least a user.

The method comprises a step S110 of sending from a first network entity of a first site (e.g. 110 in FIG. 2) to a PCR network entity of the same first site a request to obtain policy and charging information. The policy and charging information is dependent on a user profile of a user accessing the communications network from the first site. The first network entity can in general be regarded as a network entity having policy enforcement function and may thus comprise an AF or a PCEF or a BBERF.

The policy and charging information represent information required for applying certain policy and charging control rules in relation to a session associated to a user. As it will be explained later with some examples, the first network entity requests the PCR network entity to provide information necessary for applying certain policy and charging rules for a user accessing the network from the same site to which the interrogated PCR network entity belongs.

According to certain examples that will be detailed in the following, the policy and charging information may comprise information resulting from a decision taken by a PCR network entity. According to such example, therefore, the first network entity sends a request to the PCR network entity such that a corresponding decision can be taken and its result provided back to the first network entity. Therefore, in such an example, the policy and charging information are the information provided as a result of a decision by the PCR network entity and correspond to the mentioned request.

It is noted that the user is accessed in the network from the first site such that by default typically such request is forwarded to the OCR network entity comprised in the same site from which the user is accessing the network.

According to another example, the policy and charging information may comprise information concerning requests for resources which depend on the user profile. For instance a "gold" user may obtain more resources than available to an average user. According to a further example, the policy and charging information may comprise information related to policy and charging control and obtained on the basis of an application to be provided to the user, e.g. the policy and charging information may be related to a session or media corresponding to an application or corresponding session requested by a user.

Later in the disclosure examples will be provided showing how said request can be implemented by means of OCR and/or AAR messages.

The method then foresees a step of determining whether the user profile is accessible at the PCR network entity of the first site (S115). Determining whether the user profile is accessible at the network entity implies determining whether the network entity is capable of directly having access to such user profile. This is the case, for example, if the user profile is stored in the network entity itself or if it is stored in a database or storage entity directly connected or connectable to the network entity. More in general, it is determined that the user profile is directly accessible if the network entity is aware of where the user profile is stored such that it can be retrieved by the same network entity.

In case it is determined that the user profile is accessible at the PCR network entity, then standard processing is performed (S118) as it will also be explained in the following with reference to some examples.

In case it is determined that the user profile is not accessible at the PCR network entity, then at step S120 it is generated a redirection message on the basis of the request wherein the redirection message comprises an identity of the PCR network entity of the first site (PCRF-1). The redirection message is based on the request, which implies that it may comprise information dependent on the content of the initial request sent. Moreover, the redirection message comprises an identity of the PCR network entity that does not have access to the user profile needed. A non limiting way of generating such a message is creating a reply to the request and adding to such reply an identity of the PCR network entity. The identity represents information through which it is possible to establish communication or exchange messages with the entity associated to such identity. An example of the identity is any kind of address (like IP address, MAC address, etc. . . . . ) which would allow another network entity to exchange messages or establish communication with the PCR network entity.

The method then foresees a step of forwarding (S130) the redirection message to a PCR network entity of the second site. The forwarding can be performed by the PCR network entity of the first site (i.e. directly by the PCR network entity which does not have direct access to the user profile) to a PCR network entity of another site. In case more than two network sites are present, the selection as to which PCR network entity of which site to send the redirection message can be made in several ways as explained in detail in the following examples or embodiments. In an alternative example, the step of forwarding S120 the redirection to a PCR network entity can be performed by the first network entity of the first site. This is also the (non limiting) case explained in more detail in the following examples or embodiments.

Thanks to the present method, it is possible to redirect messages based on an initial request to another network entity that may possibly have access to a user profile needed to reply to the initial request, wherein the forwarding is more efficient since it is initiated by the PCR network entity and since it comprises also the identity of the PCR network entity not having access to the user profile. Such solution does not suffer from the disadvantages and limitation of the prior art, as for instance it does not require that a realm shall coincide with a site.

Figure 11:
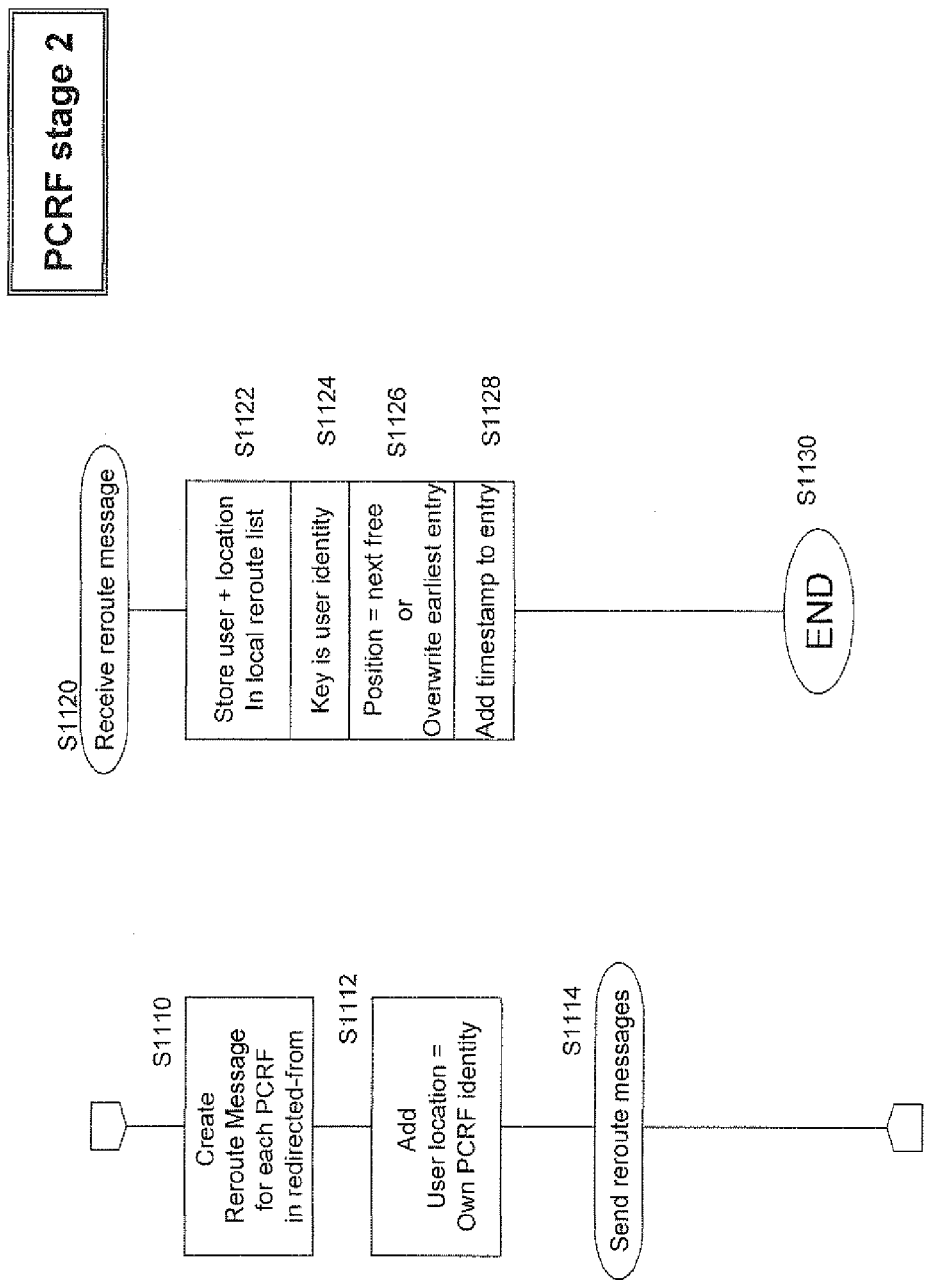
FIG. 11 represents a flow chart illustrating how a PCR network entity functions in a scenario as illustrated in FIG. 8 (stage 2)
Figure 12:
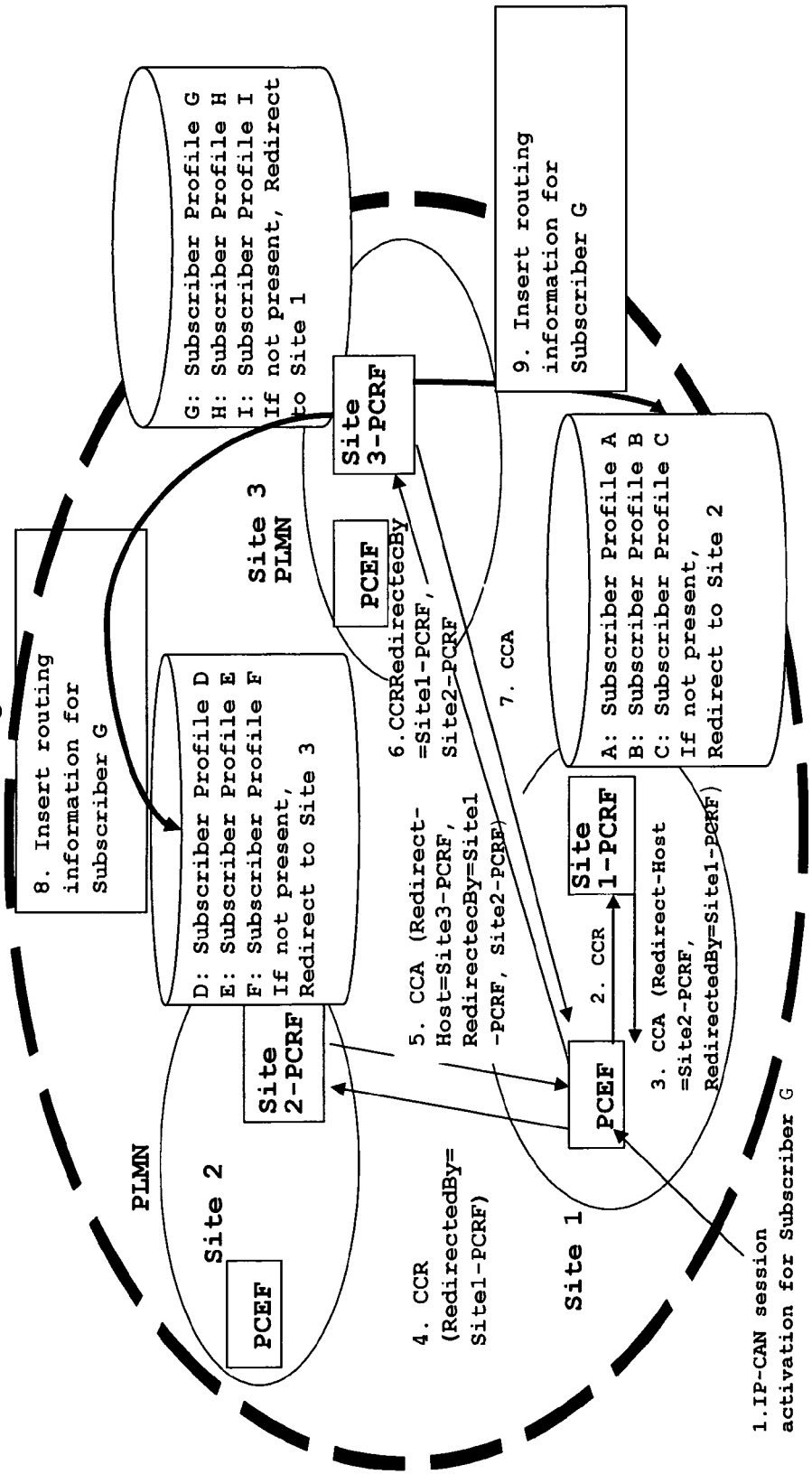
FIG. 12 illustrates a block diagram representing a network architecture according to an embodiment of the present invention.
Figure 13:
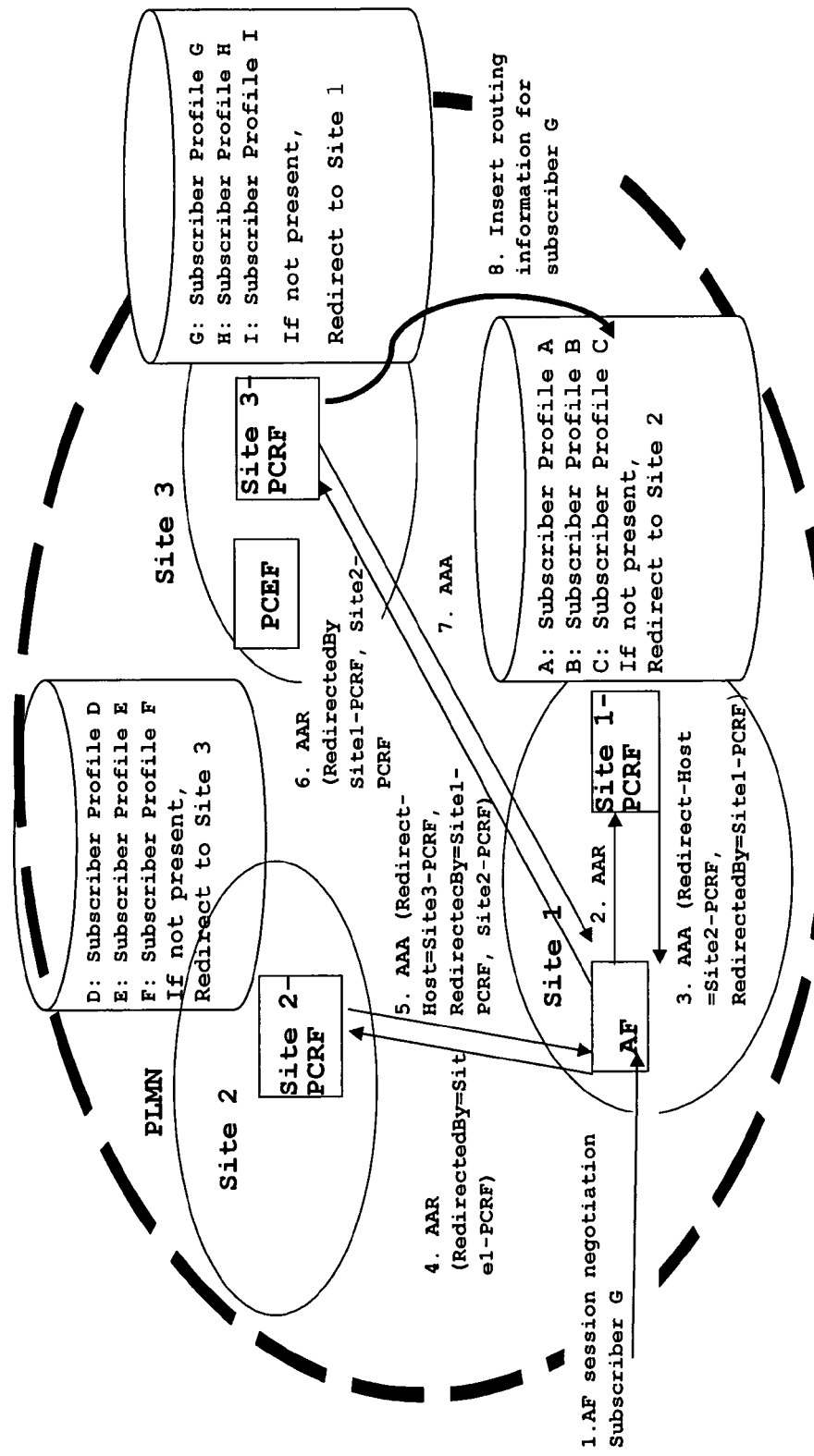
FIG. 13 represents a block diagram of a communications network according to an embodiment of the present invention.

According to an optional implementation, the method of the first embodiment may further comprise a step of sending from the PCR network entity of the second site (e.g. PCRF-2 in FIG. 2) to at least the PCR network entity of the first site (e.g. PCRF-1) a message indicating that the user profile is accessible at the PCR network entity of the second site PCRF-2. It shall be noted that the message from the FOR network entity of the second site can be sent optionally directly to the FOR network entity of the first site; however, other implementations are possible wherein the message is sent from the PCR network entity of the second site to other intermediate notes including the first network entity of the first site. The mentioned message can be intended, in one example, as a reply to the initial request, wherein the initial request is the request explained with reference to step S110 to obtain policy and charging information. The message indicates that the user profile is accessible at the PCR network entity of the second site; therefore, the message comprises information indicating to the PCR network entity of the first site an identity of the PCR network entity of the second site. This message may be referred as availability message or as availability notification, since it indicates or notifies other FOR network entities about which POP network entity has access to or availability of the user profile. According to one optional implementation, the step of sending may be preceded by a step of generating a message (which is generated due to a process initiated by the initial request) and by adding to the generated message an identity of the PRC network entity of the second site. Such message comprising the identity of the PRC network entity of the second site is then sent back to the PCR network entity of the first site. In case multiple sites are present in a communications network, the redirection message may reach a target network entity possibly after one or more hops, wherein the target network entity is a PRC network entity which has direct access to the user profile needed for implementing the policy and charging rules. The redirection message received by the last PRC network entity having access to the user profile may contain an identity of at least one, more or all of the identities of the PRC network entities by which the initial request was redirected. The last (target) PRC network entity would then generate a message including an identity of the last (target) PRC network entity and send such message to one, more or all the PRC network entities indicated in the redirection message that reached the last PRC network entity. In the following several examples will be given of how such message can be propagated. Reference is made e.g. to FIGS. 12 and 13 showing, respectively, steps 8 and 9 for sending these messages to other PCR network entities. Further examples are provided in FIG. 7 to 11 or 14. In FIG. 2, such a message (not depicted) may be a message sent from PCRF-2 to PCRF-1.

In other words, the message is sent back to one, more or all of the PRC network entities which have redirected the initial request since none of them had access to the user profile. In this way, each PRC network entity along the route can get knowledge of which PRC network entity has direct access to a user profile and cache such information for further later use. Thanks to this arrangement, information regarding availability of user profiles can be easily distributed in a network without the need of expensive and complicated configuration of network devices.

In an optional implementation, the message indicating that the user profile is accessible at the PCR network entity of the second site may also comprise the entire user profile that can further be optionally stored or cached at the PCR network entity of the first site.

According to an optional implementation, the communications network may further comprise a third site including a PRC network entity. An example of such, a communications network is represented in FIG. 7, 8, 12 or 13 to which reference is also made. When a communications network comprises a third site or even further sites, then the method may further optionally comprise a step wherein, if it is determined that the user profile is not accessible at the PCR network entity of the second site, generating a further redirection message on the basis of at least one among the request (e.g. the originally request sent from the first network entity to the PRC network entity of the first site) and the redirection message (i.e. the redirection message originally sent to the PRC network entity of the second site).

The further redirection message comprises at least one among an identity of the PRC network entity of the first site and an identity of the PRC network entity of the second site. In other words, a further redirection message propagates the identities of the PRC network sites which do not have access to the user profile.

According to this optional implementation, the method then comprises a step of forwarding the further redirection message to the PCR network entity of the third site. Thereafter, the method comprises a step of sending from the PRO network entity of the third site to at least one among the PRO network entity of the first site and the PRC network entity of the second site a further message. This further message indicates that the user profile is accessible at the PRC network entity of the third site. That is to say, when more than two sites are present and a PRC network entity is not found as having access to a user profile after one hop, than another redirection message is generated propagating the identities of the PRC network entities not having access to the user profile until a PRC network entity is found having access to the user profile. Upon reaching such PRC network entity, a message is sent to one, some or all the PRC network entities the identities of which have been propagated and which did not have access to the user profile. For this message of further message the same considerations apply as made above with reference to the message called availability message.

As evident from the above, the above concept can be extended to a fourth site and to even further sites, theoretically to an infinitive number of sites. The decision as to which PRC network entity to forward the redirection message can be done in several ways as it will be detailed also in the following examples or embodiments. Here, it suffices to say that this may be chosen from a list of preconfigured network entities in a random way or in a round-robin way; by performing discovery of network entities; by exchanging information about PRC network entities known among neighbouring network entities; etc. . . . . Thanks to this arrangement, as explained above and as also more detailed in the following, information about which PRC network entity has access to a user profile can be easily propagated in a network. Moreover, network entities not having access to a user profile may conveniently update a list associating user profiles to PRC network entities on which said profile is accessible or available. Moreover, this list can be maintained in a dynamic way thus minimizing the maintenance and the initial configuration requirements. Furthermore, such list can be maintained of a small size since it is created as needed or reduced in size as needed, for instance by deleting entries which have not been used for a given time or replacing the oldest entries with newer entries.

According to an optional implementation, the message or the further message above mentioned may comprise information identifying at least the PRC network entity in which the user profile is accessible. Further identities of further nodes or network elements may also be included in the message or in the further message as long as it is included or added the identity (e.g. an address) of the network entity which has direct access to a user profile. In the case of multiple sites, the identity included in the final message will be the identity of the last network node at the end of the redirection path and which has access to the user profile needed for applying certain policy and charging rules.

According to one example, the user profile information may be stored at the PCR network entity of the first site according to predetermined conditions. In other words, when the PCR network entity of the first site receives the user profile information, it may decide to store them according to certain conditions or rules. In one example, such conditions may determine that previously received user profile information shall be deleted after a certain predetermined time expires or that newly received user profile information shall replace the oldest received user profile information.

According to an optional implementation, the method may comprise the further step of the first network entity of the first site requesting to handle a session for a user and wherein the user profile is associated to this user accessing from the first site. Handling a session implies all those operations that may need to be performed with relation to a session associated to a user like for instance: establishing a new session; negotiating a session or parameters of a given session; modifying an existing session or parameters thereof; etc. . . . . The user may be, in one example, a subscriber; however, the invention is not limited to a subscriber but can also be applied to a generic user not associated to a subscription or to a specific registration as long as the user is capable of accessing the network and suitable for being associated to a user profile (e.g. a generic user profile).

According to one modification of the first embodiment, the first network entity of the first site may comprise a network entity including a policy and charging enforcement function as a PCEF element described above. In such a case, the mentioned request to obtain policy and charging information may comprise a request to obtain policies corresponding to a user establishing a session with the first network entity of the first site. Later in the description it will also be provided an example wherein this can be performed by means of a CCR message. According to an optional implementation of this modification, the PRC network entity of the first site PCRF-1 may determine a policy and charging decision based on the request and on the user profile. The decision implies that certain policy and charging rules are determined such that they can be enforced by a PCEF element for instance. Examples of decision could be: which QoS to apply to a user or to a session; which charging rules to apply to a user or to a session or to a specific session for a specific user; whether access restrictions shall be applied; etc. . . . . The decision is communicated to a first network entity comprising enforcement functions like a PCEF element, which will then enforce the decision according to the policy and charging rules communicated.

According to a further modification of the first embodiment, the first network entity of the first site may comprise a network entity including an application function AF. In this context, the request may comprise a request to obtain policy and charging information relating to an application offered by the network entity including an application function AF. Further details of this modification of the first embodiment will be given later with reference to further examples or embodiments.

According to an optional implementation of this further modification, the PRO network entity of the second site PCRF-1 may determine which resources to assign on the basis of the obtained policy and charging information and on the user profile. The determination of the resources is only an example, as in fact generally the PRC network entity generally determines which policy and charging rules to apply (of which resources represent only one example) on the basis of the initial request and on the user profile. It has been explained that the decision is determined by the network entity in the second site, i.e. by the network entity having access to the user profile. However, in other embodiments, the decision may be taken by the network entity of the first site once this is provided with the user profile by the second network entity. Similarly, the decision may be taken by any other suitable network entity and provided to the network entity responsible for enforcing it.

According to an example, in case the communications network comprises a plurality of sites, the last PRC network entity having direct access to a user profile determines the mentioned decision, generates a result from this decision, adds its own identity (i.e. the identity of the last PRC network entity having access to the user profile) and forwards the message back to one, more or all the PRO network entities which forwarded the redirection message and which did not have access to the user profile. In another embodiment wherein the user profile is forwarded to the PRC network entity of the first site or to one or more further entities that forwarded the redirection, message, the decision may be taken not at the last or final PRC network entity but at the PRC network entity of the first site or of other sites as circumstances may require.

In the following, a PCR network entity for handling policy and charging information relating to a user according to a second embodiment of the present invention will be described with reference to FIG. 4. The PCR network entity is for using the communications network comprising at least a first site S1 and a second site S2 wherein the PCR network entity of the second embodiment is comprised in the first site. A configuration of such a communications network is given as an example in FIG. 2. The PCR network entity of the second embodiment comprises a request receiving entity 410, a determining entity 420, a generating 430 and a forwarding entity 440. The request receiving entity 410 is adapted to receive a request to obtain policy and charging information wherein the policy and charging information depends on a user profile of a user accessing the communications network from the first site in which the PCR network entity 400 is comprised. Typically, a user accessing a communications network from a given site, when establishing, modifying or negotiating a session, would be referred to a PCR network entity of the same site from which the user is accessing regardless of whether the user profile is stored in that site or in a different site.

The determining unit 420 is adapted to determine a non-accessibility indication when said user profile is not directly accessible by the PCR network entity. In other words, the determining unit 420 performs a check as to whether it can access the user profile needed for applying policy and charging information corresponding to the session in which the user is involved. If such user profile is not accessible, then an indication of non accessibility is determined. Typically, the determining unit 420 performs such a check upon instruction from a request receiving entity 100 after receipt of the above mentioned request. However, the operation of the determining unit 420 may be controlled by a separate not depicted controlling entity and not directly by the requested receiving entity 100.

The generating entity 430 is adapted to generate, when the non-accessibility indication is determined by the determining unit 420, a redirection message. The redirection message is generated on the basis of the above mentioned request and comprises an identity of the PCR network entity of the second site. In case more than two sites are comprised in the communications network, the PCR network entity of the second embodiment may decide which identity to include (i.e. which identity of which PCR network site of which site) to include in the redirection message according to predetermined rules. For instance, a list of available PCR network entities of other sites may be available, out of which an identity of a PCR network entity is chosen in a random way; in a round-robin way, etc. . . . . Moreover, the list may be configured and maintained in any suitable manner (as also explained in the following) as long as it comprises at least a valid identity of at least one PCR network entity of a site different from the site in which the PCR network entity of the second embodiment is included. Later in the description examples will be provided as to how the redirection message may be implemented by for instance modifying an existing CCR and/or AAR message. In one example, an existing CCR or AAR message may be generated in a standard way and therein the identity of the PCR network entity of the second embodiment may be added. The original message with the appended identity may then form the redirection message generated by the generating entity 430.

As above stated, in case more than two sites are present the identity comprised in the redirection message need not to be the identity of a PCR network entity of the second site but can be the identity of any PCR network entity of any other sites different from the site in which the network entity 400 is comprised. As it is evident from this disclosure, the identity of the PCR network entity of the second site or of a further site is inserted in order to search in the network for a PCR network entity having access to the required user profile.

Figure 4:
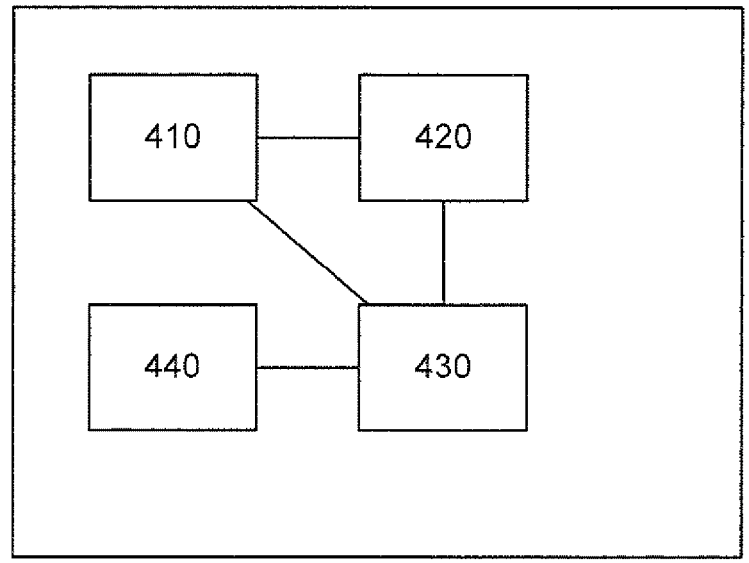
FIG. 4 represents a block diagram of a policy and charging, PCR, network entity for forwarding request messages to network entities of other sites according to an embodiment of the present invention.

The connection lines in FIG. 4 between entities 410, 420 and 430 indicate that the generating entity 430 may require information from both entities 410 and 420 when generating the redirection message. Alternatively, the generating entity 430 may obtain the necessary information from a non depicted and separated controlling entity comprised or external to the entity 400. Still alternatively, the generating entity 430 may obtain all the necessary information directly from entity 420 only.

The forwarding entity 440 is an entity adapted to forward the redirection message to a PCR network entity of the second site. In case more than two sites are comprised in the communications network, the forwarding entity will forward the redirection message according to the identity inserted the redirection message by the generating entity 430.

Thanks to the PCR network entity of the second embodiment it is possible to implement PCR network entities maintaining only a limited number of user profiles since the same is adapted to interrogate other PCR network entities for those user profiles not locally available. Moreover, since no reliance need to be made on a realm or on identity information related to a subscriber, a more flexible rerouting can be performed for searching for the needed user profile when compared to prior art solutions.

According to a modification of the second embodiment, the PCR network entity may further comprise an information receiving entity for receiving a message indicating that the use of profile is accessible at the PCR network entity of the second site. The information receiving entity can be coincident, in one example, with the entity 410 of FIG. 4 though it can be separate and distinct according to another example (not depicted).

According to this modification, the PCR network entity further comprises a storage entity for storing, according to predetermined conditions, information indicating an association between user profiles and PCR network entities belonging to other sites on which corresponding user profiles are accessible. The predetermined conditions establish how the storage entity shall be managed, i.e. according to which rules the association shall be stored and maintained. Examples will be detailed in the following showing for instance that new associations resulting from newly received replies indicating an identity of a PCR network entity having access to user profile has to replace an older entry by using for instance time stamps. However, further examples are possible as evident from the present disclosure or to the skilled reader. Thanks to this arrangement, it is possible to dynamically and flexibly configure and maintain a list of an association between user profiles and PCR network entities on which said profiles are accessible. Therefore, it is not required that all PCR network entities store all possible user profiles of all users since they can obtain and cache such information on an as needed basis. At the same time, it is not required to have a large storage entity since the number of associations needed to be stored can be limited and adapted according to resources and requirements by adjusting the predetermined conditions that manage the storage entity.

Figure 5:
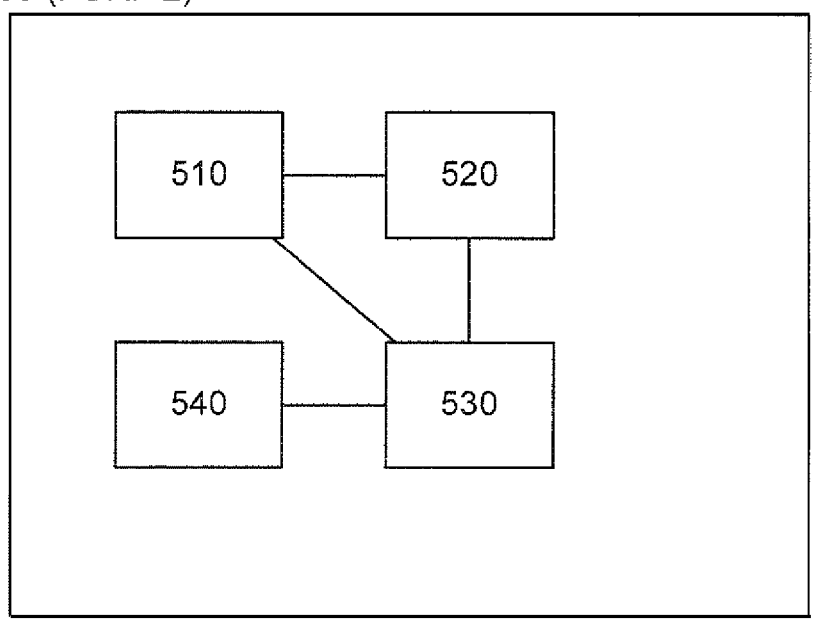
FIG. 5 illustrates a block diagram representing a PCR network entity for forwarding messages to a network entity of another site according to an embodiment of the present invention.

In the following, a PCR network entity 500 according to a third embodiment of the present invention will be described with reference to FIG. 5. The PCR network entity 500 is also capable of handling policy and charging information relating to a user in a communications network comprising at least a first site S1 and a second site S2 wherein the PCR network entity 500 is comprised in the second site. By making reference to the scenario depicted in FIG. 2, it can be said that the PCR network entity of this embodiment may correspond to the network entity PCRF-2 of site S2 of FIG. 2 as well as to the PCRF-2 or PCRF-3 illustrated in FIGS. 7, 8, 12 and 13. It shall be noted that however the PCR network entity 500 of FIG. 5 may also be combined with the PCR network entity of the first site PCRF-1 or with the PCR network entity 400 of FIG. 4. The PCR network entity 500 comprises a request receiving entity 510, a storage entity 520, a generating entity 530 and a forwarding entity 540. The request receiving entity 510 is for receiving a request message relating to a user accessing the communications network from the first site S1. The request message comprises at least an identity of one PCR network entity comprised in the first site S1. The request message relating to a user accessing the communications network from the first site may correspond to the redirection message sent by the PCR network entity 400 depicted in FIG. 4. The request receiving entity 510 may optionally coincide with the entity 410 in case the PCR network entities 500 and 400 are integrated in one entity. The request message received by the entity 510 comprises at least one identity implying that more identities may be included corresponding to several PCR network entities of several sites, in those cases wherein the communication network comprises more than two sites. In such situation (noting that in the following a case wherein three sites are comprised will be explained, thought the invention can be applied to any number of sites making up the communications network) the receiving entity 510 may receive a request message relating to a user accessing a network from any site different from the one wherein the entity 500 is located. In other words, the entity 500 is the network entity that typically stores or has direct access to the user profile of a given user which is however not accessing the network from the site wherein the entity 500 is located.

The storage unit 520 is for storing at least a user profile of said user. Optionally, the storage unit may store further user profiles of users registered with the site wherein the entity 500 is located (e.g., the second site).

The generating entity 530 is for generating a message comprising an identity of the PCR network entity 500. The message can be intended as a reply triggered by the request message received by the request receiving entity 510 as it will also be explained in the following with reference to further examples or embodiments.

The forwarding entity 540 is for forwarding the message to a PCR network entity of the first site. In other words, the message is sent to the first site so that the PCR network entity therein comprised becomes aware that the user profile is accessible or available at the PCR network entity 500 of the second site.

Thanks to this arrangement, it is possible to propagate information relating to the PCR network entity that has access to a user profile needed to the PCR network entity serving a given user at a given time. In case the communications network comprises more than two sites, the generating entity may introduce more than one identity corresponding to a plurality of PCR network entities belonging to a plurality of sites. Consequently, the forwarding entity may forward the message to a plurality of PCR network entities belonging to a plurality of sites thus propagating information as to the availability of a user profile to a plurality of PCR network entities belonging to a plurality of sites. In this way, the information can be propagated in a reliable and flexible way thus simplifying the configuration and maintenance of complex and large networks.

In an optional modification of the third embodiment, the request message may be based on an initial request to obtain policy and charging information wherein the policy and charging information is dependent on a user profile of the user wherein the user is accessed in the communications network from a site different from the site wherein the PCR network entity 500 is located. Therefore, the invention according to this embodiment is capable of dynamically distributing information relating to availability of user profiles for those users served at a given time by a site different from the site wherein such users are registered such that the correct policy and charging rules can be applied at anytime.

According to a further optional aspect of the third embodiment, the request message may comprise a plurality of identities wherein each of the identities refers to a PCR network entity among a plurality of PCR network entities each comprised in a site different from the second site wherein the network entity 500 is located. The forwarding entity is thus adapted to forward the message to at least one of the plurality of identities; i.e. to at least one of the plurality of PCR network entities belonging to a plurality of sites. This configuration applies to the case wherein a communications network includes more than two sites and allows a flexible distribution of information relating to the availability of user profiles.

According to a fourth embodiment of the present invention, it is also provided a communications system for handling policy and charging information to a user in a communications network. Such a system, as depicted for instance in FIG. 2, may comprise at least a first site S1 and a second site S2 wherein in the first site a PCR network entity as described above with reference to FIG. 4 is provided. At the same time, a PCR network entity is provided in the second site S2.

Optionally, a first network entity may be provided in the first site S1. The first network entity may be in one example a network entity including a policy and charging enforcement function or, according to another example, a network entity including an application function AF or, according to another example, a BBERF entity.

The present invention can also be embodied in a computer program for handling policy and charging information relating to a user wherein the computer program comprises instructions configured, when executed on a programmable system, to cause the programmable system to carry out the steps of any of the methods described in the present disclosure as for instance the method steps of the first embodiment. A programmable system, not depicted in the figures, may be any suitable programmable system comprising those elements or means necessary for executing a program. Examples of such elements or means are typically a processor, a storage device and input/output processing means for handling instructions of the program and/or related data.

By the way, it is noted that in order to provide an improved system over those known in the art, a solution could be applied consisting in storing a table in a central point that contains the list of all the subscribers in the operator network together with an indication of in which PCRF the subscriber profile is stored. This may however require an additional node to perform this function, which increases the OPEX and CAPEX of the solution. The above proposed solution, instead, avoids such inconvenience.

Figure 6:
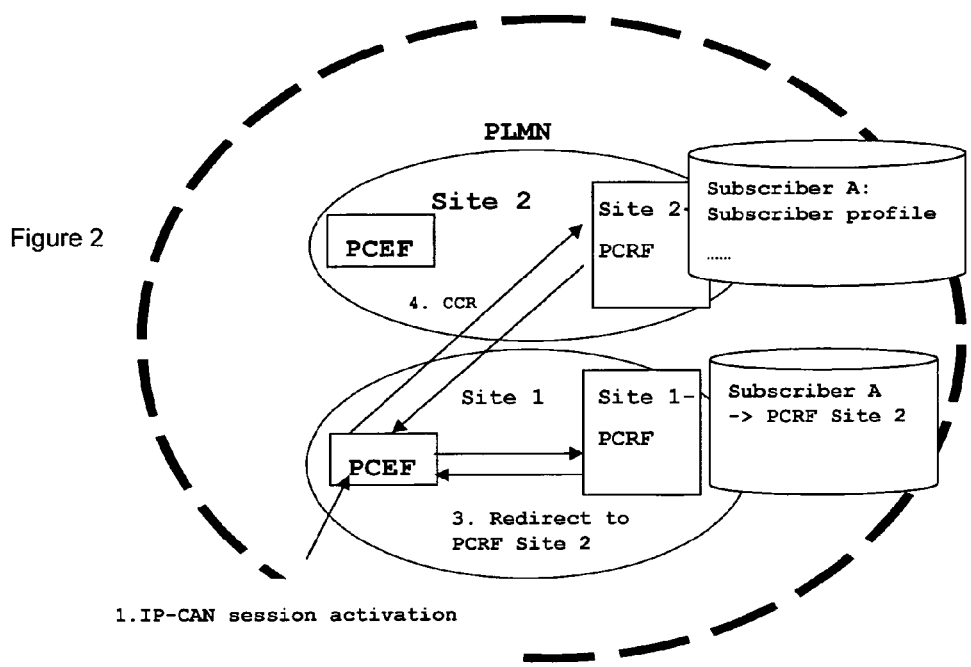
FIG. 6 illustrates a block diagram of a possible implementation for providing user profiles at several sites.

Another alternative would be to store this table in each PCRF. In this way the operator does not need additional hardware. This means that each PCRF has the list of all the subscribers in the operator's network. For the ones that are not in the site, it only contains the subscriber id and the PCRF to which the traffic is to be redirected. An example of such solution is also depicted in FIG. 6. In such a case, the operator has to provision all the subscribers in each site. Thus, these alternative solutions may imply higher OPEX (in order to assure the consistency of the information stored in the routing entity it is required an operation and maintenance solution with the cost that it supposes) and CAPEX (if a dedicated node is used to store all the subscribers the operator is forced to invest in new hardware and software) costs as the solution described in the above embodiments.

In big multisite networks, such as for example, operators in India or China, where the number of subscriber is quite big, the solution based on storing all the users routing information in all PCRFs is not feasible due to the amount of memory required. Typical examples are operators in Asia countries, such as China or India, where the number of subscribers managed by an operator is very big and usually divide their network in several sites. An operator with 100 million subscribers may require for example 6 PCRF (six different sites), which means that potentially each PCRF should store the reference of 100 million subscribers. Handling this amount of subscriber addresses in each node may be very difficult from the system capacity (CAPEX) perspective, and also it implies a big OPEX cost to maintain the consistency of the large amount of entries across the different PCRF. The solution of the invention as explained in the above embodiments (or as further detailed in the following) addresses this problem in order to give a solution that facilitates to the operator the management of the subscribers in a multisite scenario without a central database.

Figure 7:
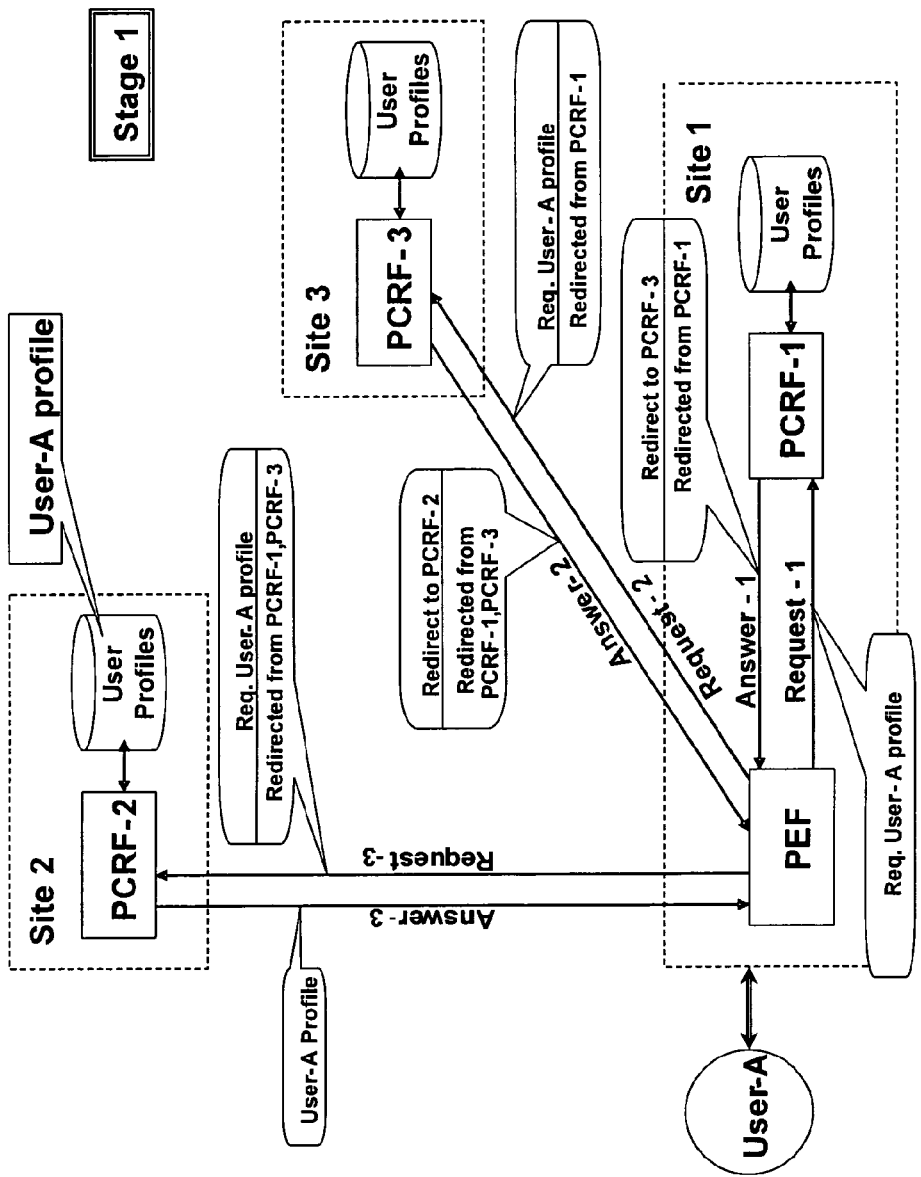
FIG. 7 represents a block diagram illustrating how the invention functions according to one of its embodiments denominated as stage 1.

Reference will now be made to FIG. 7 representing a communications network comprising three sites wherein a user A is accessing the network over site 1 but is however registered with site 2 such that its user profile is accessible at the PCR network entity of site 2. The PCRF-1 of site 1 depicted in FIG. 7 represents an example of a PCR network entity 400 described above with reference to FIG. 4 or described with reference to the method according to the first embodiment. The PCRF-2 and PCRF-3 depicted in FIG. 7 may represent examples of the PCR network entity 500 described above with reference to FIG. 5 or PCR network entities of the second site with reference to the method of the first embodiment.

It is noted that site 1 also comprises a network element denoted with PEF which is a network element comprising a policy enforcement function. Such a network element may be, according to several examples, a network entity having a PCEF function, an AF function or a BBERF function.

A short review of the steps performed in the scenario of FIG. 7 will now be explained illustrating how the principle of the invention and the above embodiments apply to the present case. The PEF entity, upon handling a session related to a user A, sends a request 1 to PCRF-1, wherein said request is related to a user profile A (i.e. corresponding to user A). As explained above or as also detailed in the following, said request may be a request for determining certain policy and charging rules to apply for a given session of user A depending on the user profile A. The PCRF-1 will check in a database whether a user profile for user A is therein available. In the depicted case, since such user profile is not locally available, PCRF-1 will generate answer-1 message specifying that the request should be redirected to PCRF-3 wherein the redirection originates from PCRF-1. The PEF upon receiving answer-1 will generate a request-2 directed to PCRF-3 wherein such request will indicate that information are required relating to the user profile A and that this request has been redirected from PCRF-1. In other words, the request-2 will be a request for user profile A indicating that such request was not successful at PCRF-1 since this first entity redirected such request. PCRF-3 will similarly check whether user profile A is available. If this is not the case, as in the situation illustrated in FIG. 7 (thus a non accessibility indication is determined), PCRF-3 will send an answer-2 to the PEF. Answer-2 will comprise a redirection to the PCRF-2 indicating that the redirection originates from PCRF-1 and PCRF-3. The answer-1 and answer-2 are examples of the redirection message and of the further redirection message according to the method of the first embodiment or according to the network entity 400 above described.

The PEF will that send a request-3 to the PCRF-2 of site 2, wherein such request indicates a request for user profile A and that said request has been redirected from PCRF-1 and PCRF-3. The PCRF-2 will determine whether user profile A is locally available. If this is the case, as in the situation illustrated in FIG. 7, then PCRF-2 will provide user profile A information to the PEF within answer-3. It is noted that answer-3 may already comprise a policy and charging rules decided by the PCRF-2 on the basis of the locally available user profile such that those rules can be enforced at the PEF of site 1. At the same time, answer-3 may optionally comprise indications that the user profile is available at site 2. Preferably, however, as also explained in the following with reference to FIG. 8, the availability of user profile at site 2 will be directly communicated to the PCRF-1 and PCRF-3 of, respectively, site 1 and site 3.

Figure 1:
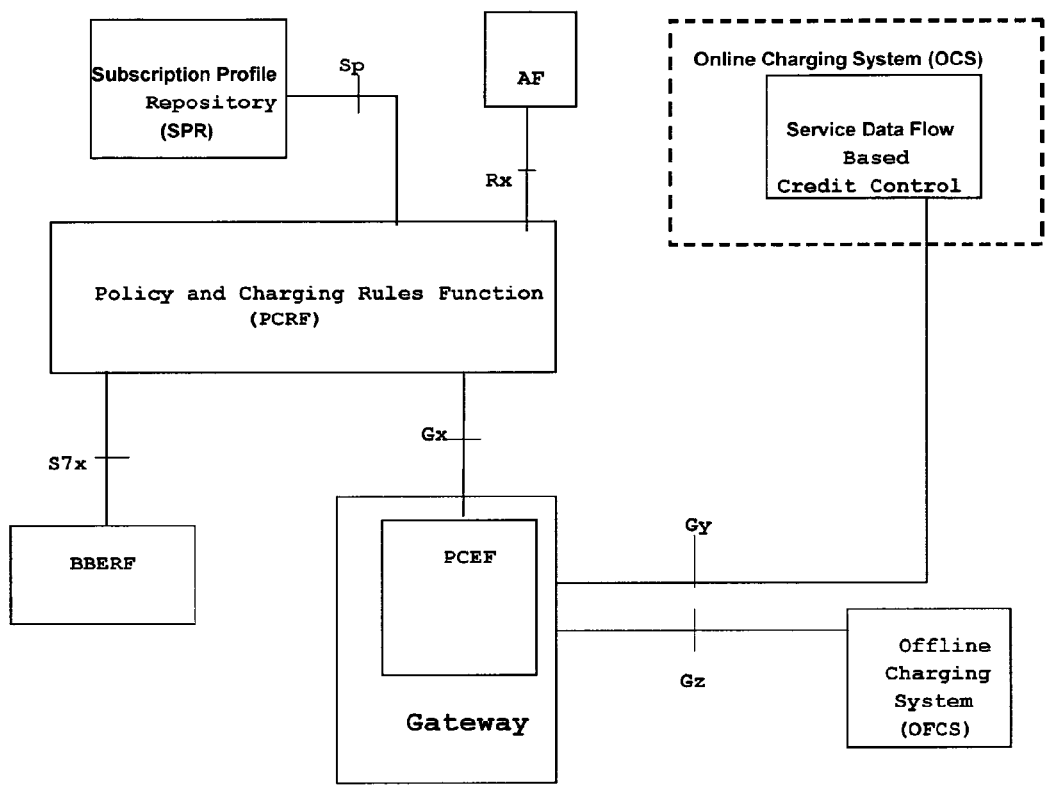
FIG. 1 illustrates a policy and charging control PCC architecture according to the state of the art.

According to the scenario depicted in FIG. 7, it is possible to redirect in a flexible and convenient way requests from one site to the other by relying on simple internal configurations of each PCR of each site without the need to rely on realm-based routing solutions which would impose constrains as to the flexibility in which the network is deployed since a realm has the coincide with a site (which is not the typical case in actual implementations). Consequently, the present invention allows a flexible and reliable configuration and maintenance of a network having a scenarios depicted in FIG. 7. The scenario depicted in FIG. 1 is denoted as first stage and relates to the stage of finding the PCR network entity having access to the user profile by dynamically rerouting or forwarding the request.

Figure 8:
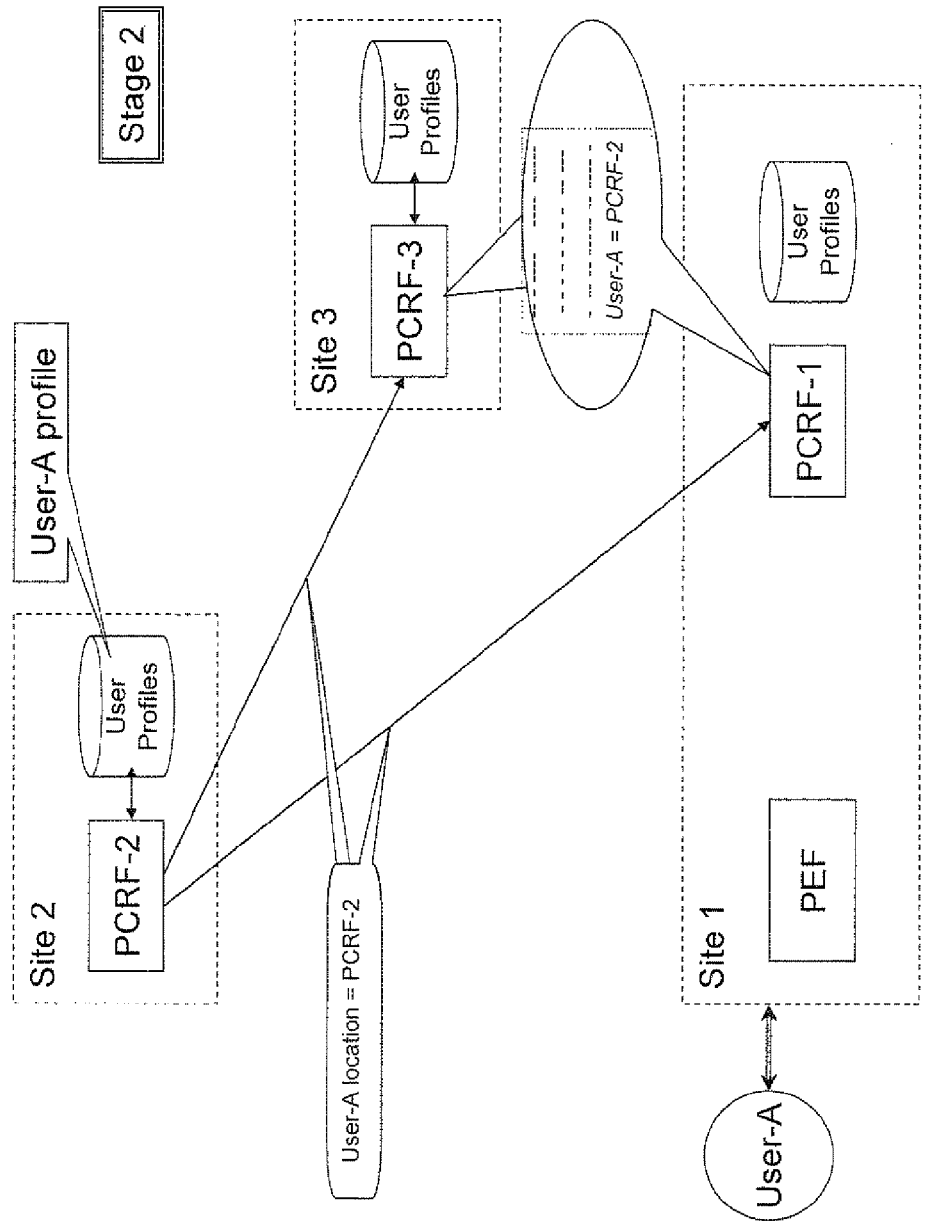
FIG. 8 represents a block diagram illustrating how a further embodiment denominated as stage 2.

Reference will now be made to FIG. 8 illustrating an example of certain steps that are executed once a redirection request reaches a PCR network entity having access to the request user profile. This scenario is also denoted as stage 2, since it follows the stage wherein the PCRF-2 is reached. Reference is made also to the above explanation for those parts of FIG. 8 which correspond to those of FIG. 7 and which have the same indication and reference signs. Once the PCRF-2 has determined that it has local access to user profile A, it will send a message indicating "user A location=PCRF-2" to the PCRF-1 and PCRF-3 of, respectively, sites 1 and 3. In other words, this message indicates that PCRF-2 has access to the user profile. The message may comprise the user profile itself or simply an identity of PCRF-2 indicating that PCRF-2 has access to user profile A. Thereafter, the PCRF-1 and PCRF-3 will update their list associating a user profile with a site or with a PCR network entity of a given site which has access to the given user profile.

In this way, the present invention allows a dynamic and flexible configuration and maintenance of tables listing where user profiles are accessible. By appropriately setting the conditions for managing the table stored at the PCR network entities, it is also possible to control the sizes of such tables such that they may keep small or reasonable dimensions while still caching the most recent users visiting a given site or those users which more frequently visit the site over a given period of time.

Figure 9:
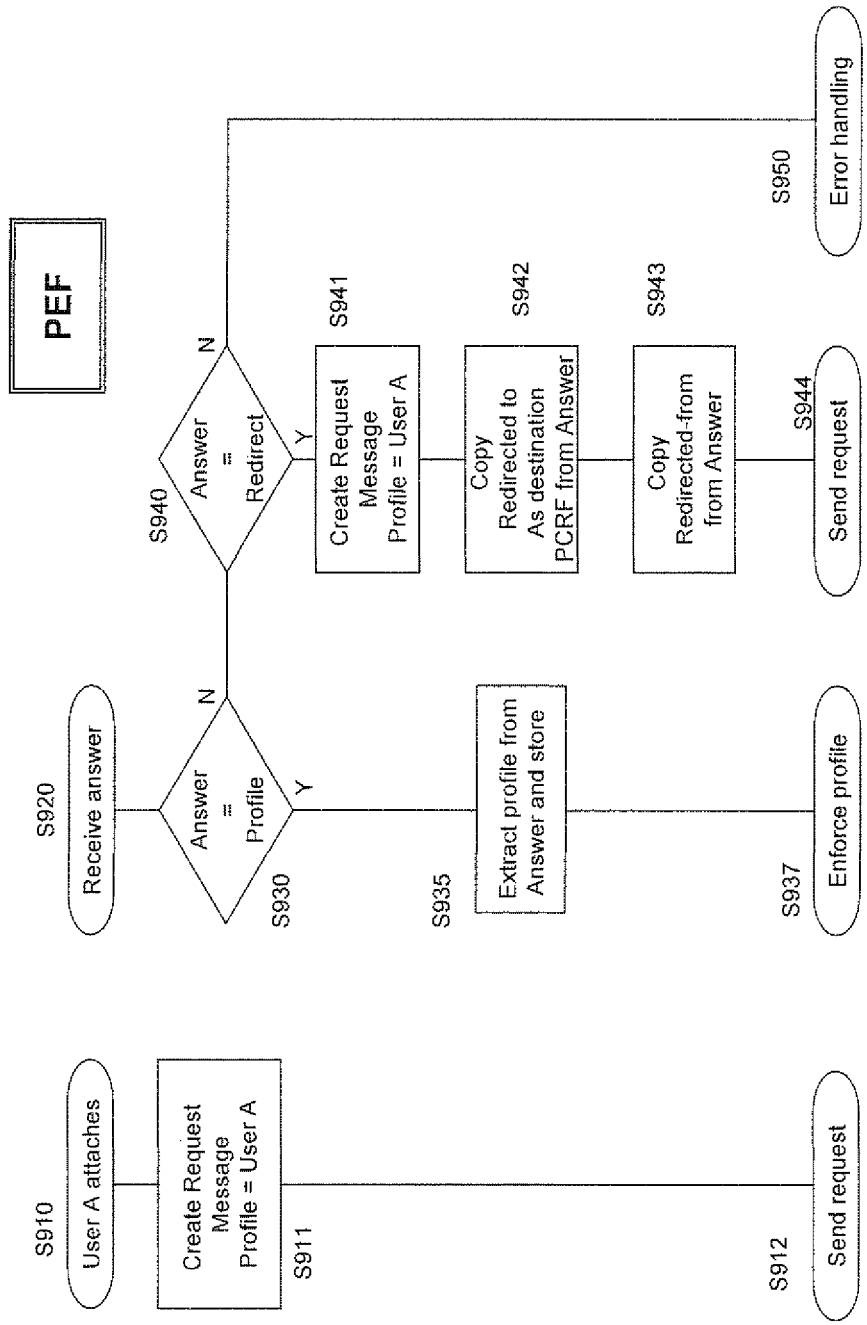
FIG. 9 represents a flow chart illustrating how a policy enforcement function operates according to an embodiment of the present invention.

Reference will now be made to FIG. 9 illustrating flow charts representing the operations performed by a PEF entity as depicted in FIG. 7 or 8 or as discussed above in the several listed embodiments explained in conjunctions with the corresponding figures. In step S910, user A attaches to the network; consequently, in step S911, the PEF creates a request message profile indicating that the user profile of user A is requested. Later with reference to FIGS. 12 and 13 it will be shown further examples of how such message can be created. Thereafter, in step S912, such message is sent as also indicated in FIG. 7 with reference to the first phases of the user A accessing a site (see PEF sending request-1 to PCRF-1).

In S920, the PEF receives an answer from a PCRF entity. In step S930, the PEF determines whether the answer received comprises a profile or profile information. In the positive (the branch denoted with "Y"), in step S935 the profile or the profile information are extracted from the answer and stored. However, step S935 may be replaced by a step wherein rather than receiving the profile the PEF may receive an indication that the profile is available at a given. PCR network entity. Alternatively, step S935 may be replaced by the PEF receiving the policy and charging rules to be applied for the user A which attached at step S910. The reception of the policy and charging rules represents an indication that the user profile is accessible at the PCRF which sent the request received at step S920. Therefore, at step S930 it can be determined that the PCRF has access to the user profile when a policy and charging rule is received, since such policy and charging rule has been determined on the basis of the available user profile. In case the user profile is not received but only an identity of PCRF-2, then the identity is extracted at step S935.

Going back to step S930, when it is determined that the user profile is not available (branch denoted with "N"), a check is performed at step S940 as to whether the answer comprises a redirection. If this is not the case ("N" branch of S940), then an error is handled at step S950. In case the answer is a redirection ("Y" branch), then at step S941 a request message profile is created indicating that the user profile A is requested. At step S942, optionally, a copy is made and redirected to another PCRF network entity of a different site. The copy of the request shall comprise the identity (e.g. an address) of the PCRF from which the answer was received at step S920. At step S943, from the message received as answer in S920, the "redirected-from" identity of the PCR network entity is copied into the request message. At step S944 a request is therefore sent. In other words, at step S941 a new request is created while at steps S942 and S943 information are extracted (or copied) from the answer received at step S920 so that the request assembled comprises information extracted from the answer wherein such information are the "redirected to" representing the PCR to which the request shall be redirected and the identity of the PCR from which the answer arrived at step S920.

In other words, steps S920 to S944 represent the operations that the PET performs when redirecting requests and receiving answers as indicated by request-2, answer-2, request-3 and answer-3 in FIG. 7.

Figure 10:
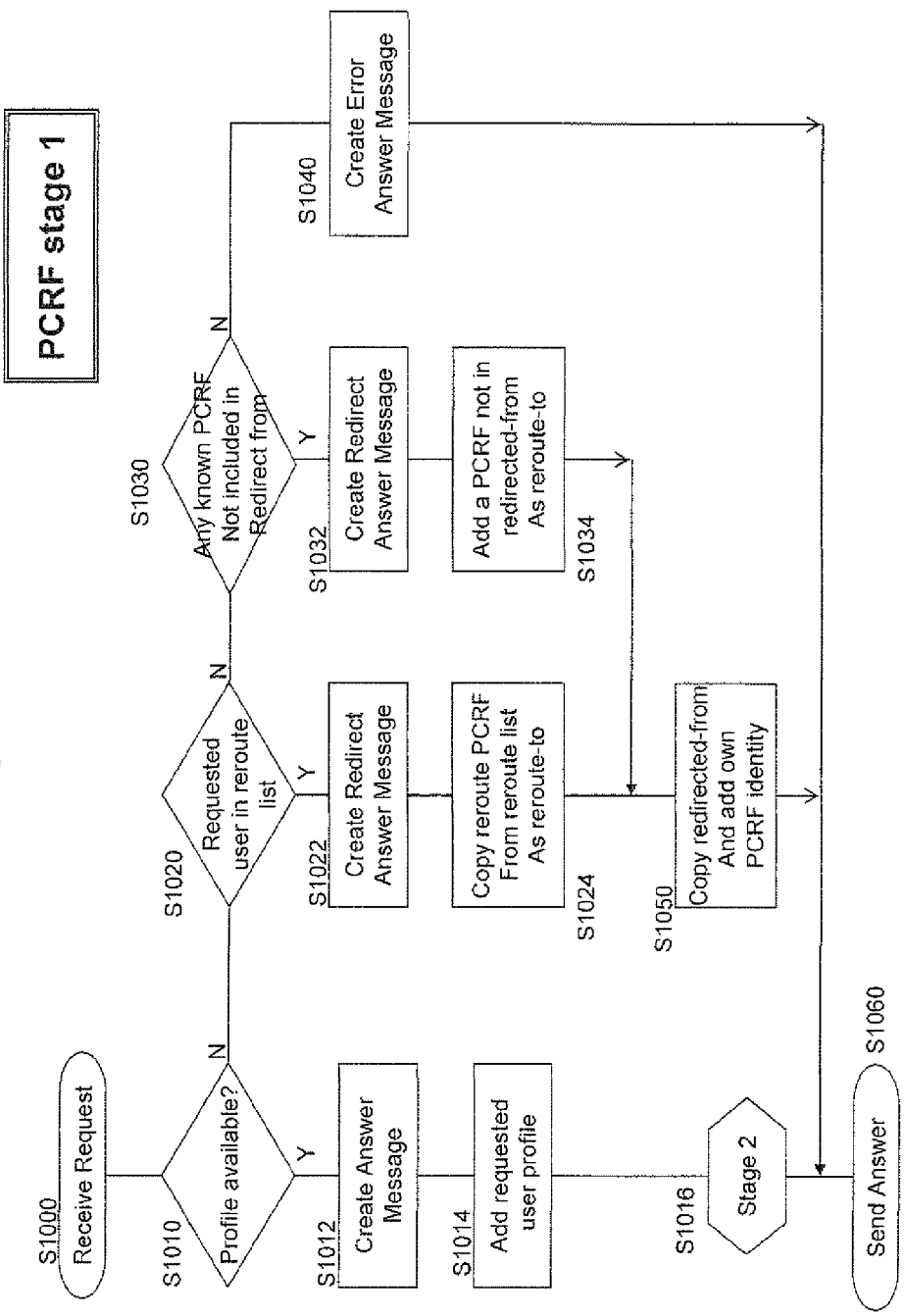
FIG. 10 represents a flow chart illustrating how a PCR network entity works in the scenario represented in FIG. 7 (stage 1)

Reference will now be made to FIG. 10 illustrating operation of a PCRF with reference for instance to the scenario depicted in FIG. 7 (stage 1). At step S1000, a PCRF receives a request. At step S1010 it is determined whether the user profile is available or accessible at the PCRF. Thus, it is determined that a message can be prepared indicating that said user profile is accessible at this PCRF. Thus, if the local profile is locally available (branch "Y"), at step S1012 a message is created (e.g. an answer to the initial request or a message to indicate accessibility or availability of a requested user profile). At step S1014 the user profile may be added to the message in an optional implementation. Preferably, however, instead of the entire user profile it is only provided an indication that the user profile is available at this PCRF. This indication that the user profile is available may also comprise an identity like an address of the PCRF having access to said user profile. At step S1016 the steps as depicted in FIG. 11 (stage 2) are executed and thereafter the answer is sent at step S1060. Returning back to step S1010, when it is determined that a user profile is not available (branch "N", i.e. a non accessibility indication is determined) then step S1020 is executed: herein, it is determined whether the requested user profile is provided in a reroute list available at the PCRF. In the positive answer (branch "Y"), at step S1022, it is created a redirect answering message. At step S1024 a "reroute-to" field of the message created is assigned by copying the identity or address of the reroute PCRF indicated in the reroute list. In other words, an identity or address is taken from the reroute list corresponding to the PCRF to which the message created at step S1022 shall be sent. Thereafter, at step S1050 to the created message it is added the identity of the PCRF executing the steps herein described as well as the identity of the "redirected-from" is copied from the received request into the created message. In this way, the message that will be sent at step S1060 comprises the identities of the PCRFs which do not have access to the user profile.

Returning back to step S1020, in the negative answer (branch "N"), step S1030 is executed wherein the PCRF determines whether it knows other PCRFs not included in the received request (it is to say, identities not included in the "redirected from" field comprised in the received request). In the negative answer (branch "N"), step S1040 is executed wherein it is created an error answer message which is then sent at step S1060. In the positive answer at step S1030 (branch "Y"), at step S1032 a redirect answer message is created. At step S1034 a PCRF is added to the created message, wherein the identity of the PCRF added to the created message is not one comprised in the field "redirected-from" of the message received at step S1000. The added identity is added to the created message as a "rereoute-to" information. In other words, at step S1032 to S1034 a new message is created which is to be forwarded to a PCRF different from those PCRFs which have already redirected the message received at step S1000. Thereafter, steps S1050 to S1060 are performed as above explained.

Reference will now be made to FIG. 11 illustrating steps that are performed at a PCRF in stage 2 corresponding to the scenario depicted in FIG. 8 (stage 2). Accordingly, at step S1110, a reroute message is created for each PCRF whose identity is comprised in the field "redirected-from" of the message received by the PCRF. In other words, the PCRF receives a message comprising in a field denoted as "redirected-from" the identities of those PCRFs which have previously redirected the message since they did not have access locally to the requested user profile. At step S1112, it is added to the created message a user profile location information indicating wherein the user profile requested can be accessed (namely, this user profile is accessible at the PCRF executing the steps of FIG. 11). Therefore, at step S1112, its own PCRF identity is inserted in the message created. Thereafter, at step S1114, reroute messages are sent to all those PCRFs indicated in the message received for instance at step S1000.

Steps S1120 to S1130 explain instead the operations performed by a PCRF like for instance the PCRF-1 and PCRF-3 of FIG. 8. At step S1120, each of said PCRF-1 and PCRF-3 receives a reroute message. In this example, at step S1122, the user profile is stored in association with the location of which PCRF has access to the user profile. This association can be stored in a local reroute list, as illustrated in FIG. 8. At step S1124, a user identity may be inserted as a key for retrieving the mentioned association. At step S1126, a position needs to be determined as to where to write in the local resource list. In one example, the next available position is chosen for writing the mentioned association. However, in case no free position is available, the earliest entry/oldest entry is overwritten. At step S1128, a time stamp may added to the newly entered entry. The process is ended at step S1130.

Further examples will now be provided explaining how the invention works. Accordingly, a mechanism is provided in which each PCRF has initially only provisioned the information of the subscribers that belong to its corresponding site. Also, each PCRF maintains a cache routing table storing the routing information of a configurable number of subscribers that has initiated a session most recently. The mechanism then propagates subscriber routing information in a dynamic way as an alternative to other prior art solutions based on a static pre-provisioning of the routing information of all the subscribers.

The invention is applicable to any PCRF diameter client, either AF or PCEF as follows. When a PCRF CLIENT, PCEF or AF, receives the establishment of session for a specific subscriber, it sends the request to the PCRF "A" defined in the PCRF CLIENT. If the PCRF "A" has the subscriber profile in its database, i.e. it is a home subscriber, the request is served by PCRF "A". If the PCRF "A" does not have the subscriber profile in its database, it shall send a redirect indication towards the PCRF CLIENT that includes a redirect-host. To resolve the redirect host to be included in the indication, it can be that the PCRF "A" knows, according its routing tables, in what PCRF "B" the subscriber is, so in this case it will answer to the PCRF CLIENT with a redirect indication towards this PCRF "B". To the contrary, it can be that PCRF "A" has no information about the PCRF where the subscriber resides, but the PCRF "A" has the list of PCRFs available in the network, so that in this case the PCRF "A" chooses one of that list and returns its ID (identity) to the PCRF CLIENT in the redirect indication.

The sequence explained in previous paragraph can be repeated several times until the right PCRF is reached, i.e. the PCRF "A" described in previous step redirects the PCRF CLIENT to the PCRF "B"; if PCRF "B" when requested determines that the subscriber is not in its DB, then the PCRF "B" will answer to the PCRF CLIENT with a new redirection indication. When the PCRF with the subscriber in its DB is finally reached, this PCRF shall notify to the rest of PCRFs that the subscriber is part of its DB, so that the rest of PCRFS can update their cache routing tables. Some considerations at this point are made:

Each PCRF does not need to store the routing information of all the subscribers in the network. Since the solution proposed allows updating the routing tables dynamically as traffic is coursed, each PCRF can have a limited number of subscriber references, and this list will be updated when a new subscriber session is received in the network.

When a PCRF with a subscriber in its DB is requested, this PCRF can notify all the PCRFs in the network or only some of them. A criterion could be to notify only to the list of PCRFs that before reaching this PCRF were consulted in the redirection chain or only to the first PCRF consulted. Other criteria could be to notify only to the PCRFs that are geographically close to this PCRF, based on the fact, that most probably a user in a multisite network moves around the area managed but this PCRF and the adjacent areas. The criteria may be configurable by the operator to tailor the solution to the characteristics of the operator network.

When a PCRF is notified by another PCRF, it may store in its routing table the information notified, that is, the subscriber identity ID associated with the PCRF ID (identity) that has sent the notification. If the routing table has reached its maximum capacity, the new entry should replace the oldest entry, e.g. the entry of the oldest (i.e. at the oldest point in time) subscriber that has initiated his/her last session. If the PCRF notified already has the subscriber routing information, it shall check if the information stored corresponds with the information notified and if this is not the case it shall update the information according to an example.

Since the routing table behaves as a cache maintaining the routing information of a configurable number of subscribers who has initiated a session most recently, associated to the subscriber's routing information a timestamp shall be maintained indicating the time when the last session occurred. The timestamp shall be considered when the table has reached its maximum capacity replacing the entry with the oldest time stamp by the new entry.

When overwriting an existing table entry, it may be determined if the time between the timestamp and the current time is less than a preset value; if this situation occurs repeatedly, it is an indication that probably the size of the cache may not be adequate. To detect this situation an O&M warning may be issued to the O&M system whenever an entry with a recent timestamp is overwritten.

When a PCRF is requested and it does not have information about where the user is, as it has been explained, it may choose a PCRF from the list of PCRFs that has locally configured. A criterion for this selection should be to select only a PCRF that has not been requested in the redirection chain. Also, the PCRFs in the list should be ordered following the proximity criteria.

If all the PCRFs in the network have been requested and none of them have the subscriber in their DB, the user should be considered as unknown.

The procedure to find the PCRF in which a subscriber is provisioned only takes place when the subscriber is roaming and it is not found in the cache of the visiting PCEF. This only happens when the subscriber is out of the usual site(s), that is, when he is neither in his home network nor in other sites which he often visits.

The following examples show the detailed flows according to the invention applied to the cases wherein the first network entity 110 (PCRF client) is a PCEF and, respectively, wherein the first network entity 110 (PCRF client) is an AF. It is noted that, typically, the operator provisions initially each PCRF with the subscriber profiles corresponding to the subscribers belonging to each site.

According to the first of the two above summarized examples, when a PCEF receives the establishment of an IP-CAN for a specific subscriber, it sends the CCR initial to the PCRF defined in the PCEF. If the PCRF does not have the subscriber profile in its database, it sends a redirect indication towards the PCEF. This redirect indication includes a Redirect-Host and also the identity of the PCRF that has redirected the request. The redirect host is configured in the PCRF. The PCRF receives the redirect-host and the identity of the PCRF that has done the redirection and sends an initial CCR to the redirect-host. In this initial CCR the PCRF also includes the identity of the previous PCRF or list of PCRFs that have redirected the request. If the PCRF that receives the request does not contain the subscriber profile, it redirects again to the PCEF also including the identity of the PCRF itself. Otherwise, the PCRF sends a notification to inform to the PCRFs in the network that it holds the subscription information. This can be done according to the criteria defined by the operator. There are several alternatives, for example:

- The PCRF that holds the subscription information sends a notification to all the PCRFs in the network that the subscriber is stored in its DB so that the other PCREs can know to which PCRF they must redirect the CCR requests in case they are looking for the subscriber;
- The PCRF that holds the subscription information sends a notification only to the first PCRF that was in the chain of the PCRFs consulted. This is possible because each PCRF that is consulted and performs a redirect includes its identity in the answer;
- The PCRF that holds the subscription information sends a notification to all the PCREs that have been consulted. This is possible because each PCRF that is consulted and performs a redirect includes its identity in the answer;
- The PCRF that holds the subscription information sends a notification to all the PCRFs that are near geographically near to the PCRF that hold the subscription.

FIG. 12 shows an example of the message flow. In this figure the operator has three sites: Site 1 has users A, B and C. Site 2 has users D, E and F. Site 3 has users G, H, and I. The PCRFs are configured with the option to notify to all the rest of PCRFs in the network. The new AVPs or messages discussed according to this example are shown. They represent examples of requests, answers, messages and further messages as discussed above. It is assumed that subscriber G establishes an IP-CAN session in site 1. However the Subscriber G is provisioned in the Site 3 in this example. The steps performed according to the example depicted in FIG. 12 are summarized in the following:

1. PCEF in Site 1 receives an IP-CAN session establishment for Subscriber G.
2. PCEF in Site 1 sends a CCR towards the PCRF in its site, Site1-PCRF.
3. Site 1-PCRF identifies that the Subscriber G is not in the Subscribers DB (non accessibility indication is determined), and redirects the request to Site 2-PCRF. The answer also includes its identity (Site 1-PCRF).
4. PCEF in site 1 sends a CCR for Subscriber G towards the Site 2-PCRF. The PCEF also includes the identity of the PCRF that initially redirected the request.
5. Site 2-PCRF identifies that the Subscriber G is not in the Subscribers DB, and redirects the request to Site 3-PCRF. It also appends its identity in the answer (Site 2-PCRF)
6. PCEF in site 1 sends a CCR for Subscriber G towards the Site 3-PCRF including the list of the PCRFs that have performed a redirection.
7. Subscriber G is in the Subscribers DB of the Site 3 and the PCRF accepts the IP-Can session establishment.
8. Site 3-PCRF notifies to the Site 2-PCRF and inserts the routing information for Subscriber G in Site 2-PCRF
9. Site 3-PCRF notifies to the Site 1-PCRF and inserts the routing information for Subscriber G in Site 1-PCRF With reference to FIG. 13, the second of the two above summarized examples will now be explained, namely the case wherein the first network entity 110 (PCRF client) comprises an AF. In this case the Subscriber G has already established an IP-CAN session when it is in Site-1. The Subscriber now tries to establish an AF session using an AF that is located in Site-1. When an AF receives the establishment of an AF session for a specific subscriber, it sends the AAR to the PCRF defined in the AF. If the PCRF does not have the subscriber profile in its database, it sends a redirect indication towards the AF that includes a redirect-host and also the identity of the PCRF that has redirected the request. The redirect host is configured in the PCRF. The PCEF receives the redirect-host and the identity of the PCRF that has done the redirection and sends an AAR to the redirect-host. In this AAR the AR also includes the identity of the first PCRF that has redirected the request. If the PCRF that receives the request does not contain the subscriber profile, it redirects again to the AF also including the identity of the PCRF itself. Otherwise, the PCRF sends a notification to the PCRFs in the network according to the criteria defined by the operator. The same criteria mentioned in the previous chapter would apply. In this example the PCRF in Site-3 only notifies to the first PCRF that performed the request.

FIG. 13 shows a message flow according to this example. In that figure the operator has three sites: Site 1 has users A, B and C; Site 2 has users D, E and F; Site 3 has users G, H, and I. The PCRFs are configured with the option to notify only to the first PCRF that was consulted.

Figure 14:
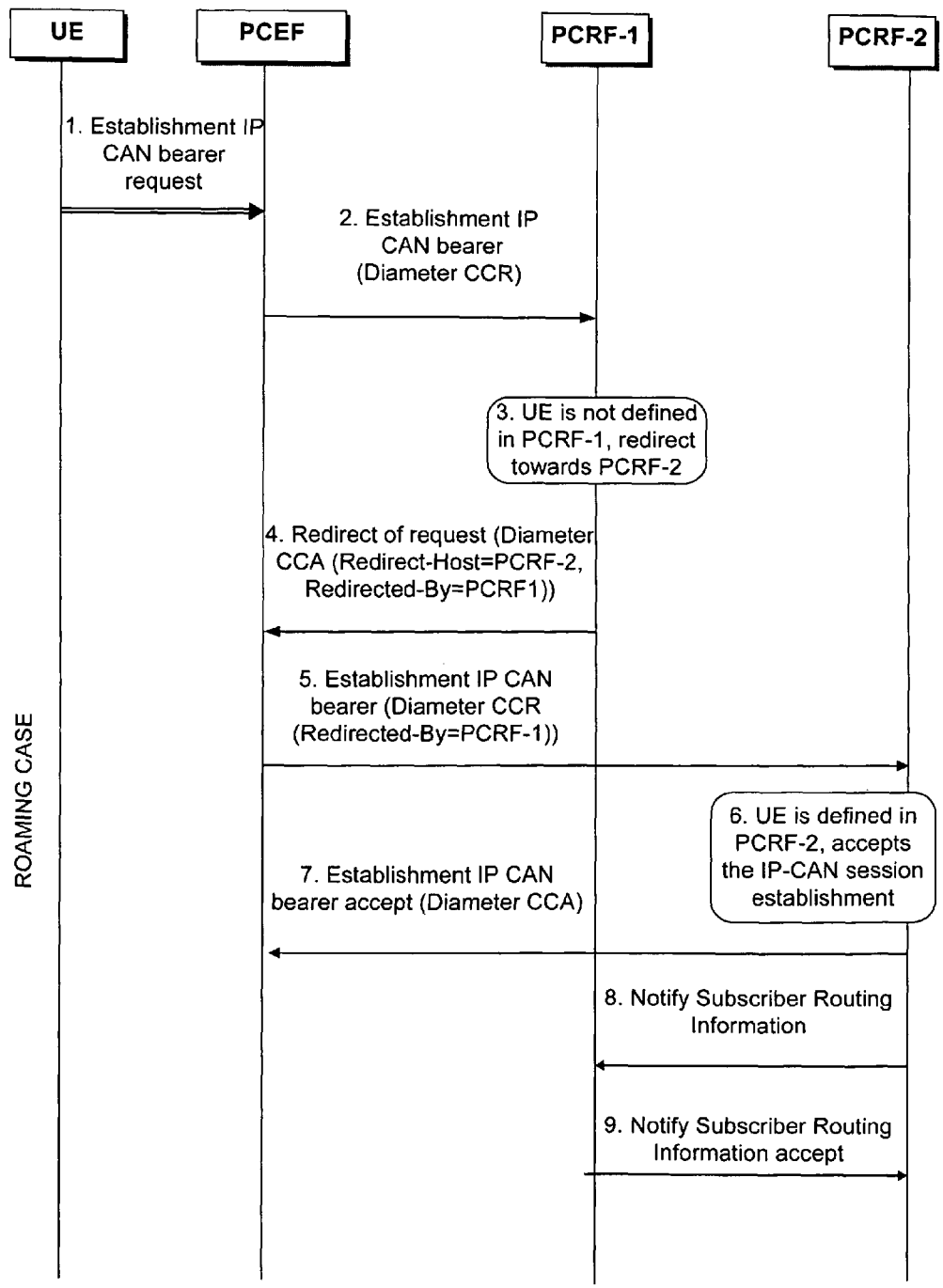
FIG. 14 represents a flow chart illustrating operations of network entities in a communication's network according to an embodiment of the present invention.

The AVPs or messages discussed in this example are shown in the figure. The Subscriber G has already established an IP-CAN session with the PCRF of Site 3. Accordingly, this are the steps performed according to this example:

1. AR in Site 1 receives an AR session establishment for Subscriber G.
2. AF in Site 1 sends a AAR towards the PCRF in its site, Site1-PCRF.
3. Site 1-PCRF identifies that the Subscriber G is not in the Subscribers DB, and redirects the request to Site 2-PCRF. The answer also includes its identity (Site1-PCRF).
4. AF in site 1 sends a AAR for Subscriber G towards the Site 2-PCRF. The AF also includes the identity of the PCRF that initially redirected the request.
5. Site 2-PCRF identifies that the Subscriber G is not in the Subscribers DB, and redirects the request to Site 3-PCRF. It also appends its identity in the answer (Site 2-PCRF)
6. AF in site 1 sends a AAR for Subscriber G towards the Site 3-PCRF including the list of the PCRFs that have performed a redirection.
7. Subscriber G is in the Subscribers DR of the Site 3 and the PCRF accepts the AF session establishment.
8. Site 3-PCRF notifies to Site 1-PCRF and inserts the routing information for Subscriber G in Site1-PCRF Reference will now be made to FIG. 14, illustrating messages exchanged among different network entities according to an example according to the intention. The elements involved are: user equipment (UE), a PCEF (representing an example of the first network entity 110 of FIG. 2), a PCRF-1 comprised in the same site of PCEF and a PCRF-2 comprised in a different site. The message flow can be summarized as in the following, according to this example:

1. PCEF in Site 1 receives an IP-CAN session establishment for the UE.

2. PCEF in Site 1 sends a CCR to establish an IP-CAN session towards the PCRF in its site, PCRF-1.

3. PCRF-1 identifies that the Subscriber is not defined in the Subscribers DB and that the request needs to be redirected to PCRF-2.

4. The PCRF-1 indicates that the PCEF needs to redirect the request towards PCRF-2, including the Redirect-Host AVP and also the information that the PCRF-1 has redirected the request.

5. PCEF in site 1 sends a CCR to establish an IP-CAN session for the subscriber towards the PCRF-2. The PCEF also includes the identity of the PCRF that initially redirected the request.

6. PCRF-2 identifies that the Subscriber is defined in the Subscribers DB and accepts the IP-CAN session establishment.

7. PCRF-2 sends a CCA towards the PCEF indicating that the IP-CAN session is established.

8. PCRF-2 notifies towards the PCRF-1 that the Subscriber is in PCRF-2 and inserts the subscriber routing information.

9. PCRF-1 inserts the subscriber routing information in its DB and accepts the Notify Subscriber Routing Information.

Figure 15:
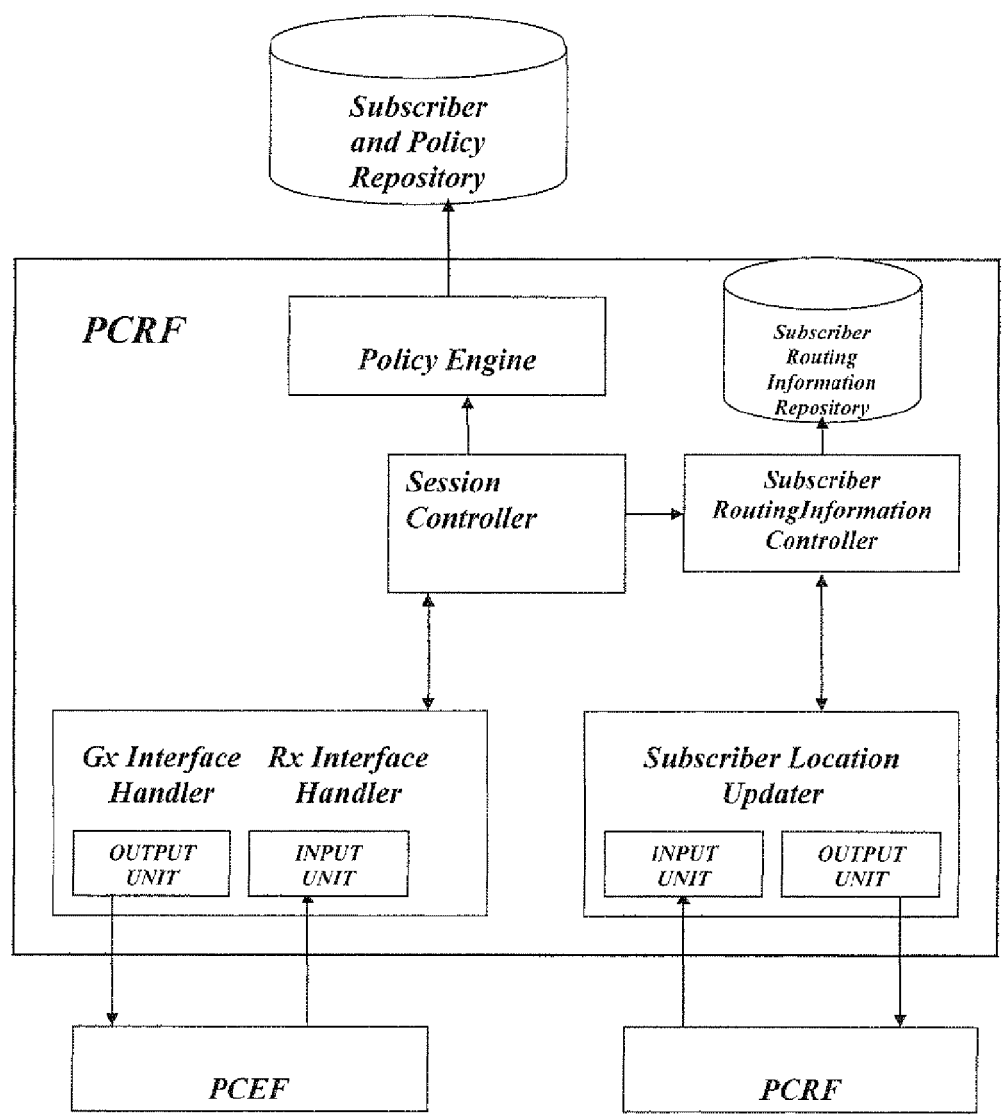
FIG. 15 illustrates a block diagram representing a PCR network entity according to an embodiment of the present invention.

Reference will now be made to FIG. 15, illustrating a possible internal PCRF architecture providing the functions and advantages of the present invention according to a non limiting example. Different implementations are possible as the appropriate to the case. FIG. 15 shows a PCRF comprising a policy engine for determining decisions as above explained and a session controller for controlling sessions associated to a user. The policy engine communicates with a subscriber and policy repository storing user profiles, for instance of those users belonging to the site wherein the PCRF is located. An interface handler is provided for handling Gx and Rx interfaces in order to establish and maintain communication with a PCEF of the same site. A subscriber location updated unit is also provided for communicating with another PCRF. The subscriber location updater is also in communication with a subscriber routing information controller having access to a subscriber routing information repository.

As it can be seen from FIG. 15, a PCRF following this example of application of the invention comprises:

A notification interface in order to propagate and receive Subscriber routing information to other PCRFs.

Means (e.g. a controller) for managing Subscriber Routing Information: the PCRF may cache the Routing information containing the last n subscribers that have initiated a session, where n may represent the maximum size of the routing table.

PCRF may detect when overwriting the oldest entry in the routing table if such entry is more recent than a configured period of time. In this case PCEF may issue a warning message.

PCRF may be able to identify the list of PCRFs that have redirected the diameter message.

PCRF may be able to identify the list of PCRFs to which the notification with the subscriber routing information location shall be sent.

PCRF may be able to identify an unknown subscriber in the case that the subscriber has been searched in all PCRFs and has not been found in the network.

According to an example of the implementation of the present invention, the PCRF client may include in each request the list of PCRFs that have redirected the diameter message.

According to another example of the implementation of the present invention, it shall be possible to insert the list of diameter peers that have redirected the diameter message, Gx request/answer or Rx request/answer. This may require a new AVP to be added in the Diameter Base Protocol RFC 3588.

The implementation of the notification interface to be used by a PCRF to notify to the rest of the involved PCRFs in the network that it holds the subscription information can be implemented using different protocols. The inventions proposed two alternatives as example, but other could be feasible as well.

According to a first implementation using SOAP: the following is an example of how the notification could be implemented using SOAP. The SOAP message includes the notification event, which has been called SubscriberRoutingInfo and the identifier of the subscriber.

```
body := "<?xml version='1.0' encoding='UTF-8'?><
    soapenv:Envelope
xmlns:soapenv='http://schemas.xmlsoap.org/soap/envelope/'
xmlns:pcrf='http://schemas.ericsson.com/pcrf/1.0/'
xmlns:typ='http://schemas.ericsson.com/udc/1.0/types/'>
    <soapenv:Header/>
    <soapenv:Body>
      <pcrf:notify>
    <notificationEvent>SubscriberRoutingInfo</notificationEvent>
    <notificationInformation typ:dN='SubscriberId=34600000111
</notificationInformation></pcrf:notify></soapenv:Body></soap
env:Envelope>"
```

Another alternative could be to use Diameter to implement this notification interface. A similar specification as the notifications between PCRFs defined in 3GPP for the S9 interface could be used. A new notification type should be added to this interface to indicate the routing notification. The TS 29.215 3GPP defines the S9 interface. The operation defined for notifications is the RAR operation. Within this operation there is an AVP <event-trigger> used to indicate the event that is being notified by one PCRF to another one. This AVP shall be extended with a new value, e.g. "SubscriberRoutingNotification".

This invention has several advantages with respect to the prior art as already discussed. Moreover, the invention:

provides a solution to allow policy control in multisite scenarios.

avoids the need of provisioning of subscription routing information in a multisite scenario.

provides a mechanism to automatically keep updated the subscriber routing information and accessible to all PCEFs in the network. This is a dynamic mechanism performed at the time of the traffic processing. E.g. when a subscriber is moved from one PCEF to another, this mechanism updates automatically the subscriber in the other PCEF's the routing tables when needed.

provides a solution to solve eventual inconsistencies in the routing information stored in a PCEF.

reduces drastically the use of memory required to store routing information in PCRFs in multisite scenarios.

reduces OPEX and CAPEX avoiding to invest in O&M solutions and new hardware and software.

allows the identification of a subscriber as roaming or unknown (not provisioned in the network).

In the above description, reference has been made to network entities or component entities (like generating entity or storage entity). It is noted that these entities can be indifferently implemented in one network node or in one network device; alternatively, they may be implemented in a plurality of network nodes or devices in which the necessary functionalities are distributed in a suitable way.

Moreover, as evident to the reader, the several embodiments and features thereof can be exchanged as necessary. The several examples may be further combined as necessary, as the reader would recognize that any combination thereof (or of parts thereof) is possible without any need to substantial modifications to what has been described.

The invention has been described in relation to particular embodiments and examples which are intended in all aspects to be illustrative rather than restrictive. Those skilled in the art will appreciate that many different combinations of hardware, software and firmware will be suitable for practicing the present invention. Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

Where the terms like communication entity, storage entity or forwarding entity are used herewith, no restriction is made regarding how distributed these elements may be and regarding how gathered elements may be. That is, the constituent parts of a unit or element or entity may be distributed in different software or hardware components or devices for bringing about the intended function. A plurality of distinct elements may also be gathered for providing the intended functionalities.

Any one of the above-referred entity of a network entity, or an element, or a network device, or a network node, etc. . . . may be implemented in hardware, software, field-programmable gate array (FPGA), application-specific integrated circuit (ASICs), firmware or the like.

In further embodiments of the invention, any one of the above-mentioned and/or claimed parts like generating entity or storage entity (this list being not exhaustive) may be replaced by corresponding generating means or storing means.

In the following, some of the abbreviations used in the present disclosure:

AF Application Function
GGSN Gateway GPRS Support Node
GW Gateway
IP-CAN IP Connectivity Access Network
PCC Policy and Charging Control
PCRF Policy and Charging Rules Function
SDF Service Data Flow
GTP GPRS tunneling Protocol
PCEF Policy and Charging Enforcement Function
PLMN Public Land Mobile Network
QoS Quality of Service
SPR Subscription Profile Repository
IP-CAN bearer: IP transmission path of defined capacity, delay and bit error rate, etc. An IP-CAN bearer in GPRS is a PDP context.
IP-CAN Session: Association between an UE and an IP network. The association is identified by a UE IP address together with an UE identity information, if available. An IP-CAN session incorporates one or more IP-CAN bearers. Support for multiple IP-CAN bearers per IP-CAN session is IP-CAN specific. An IP-CAN session exists as long as the UE IP address is established and announced to the IP network.

| AF | Application Function |
|---|---|
| GGSN | Gateway GPRS Support Node |
| GW | Gateway |
| IP-CAN | IP Connectivity AccessNetwork |
| PCC | Policy and Charging Control |
| PCRF | Policy and Charging Rules Function |
| SDF | Service Data Flow |
| GTP | GPRS tunneling Protocol |
| PCEF | Policy and Charging Enforcement Function |
| PLMN | Public Land Mobile Network |
| QoS | Quality of Service |
| SPR | Subscription Profile Repository |
| IP-CAN bearer: | IP transmission path of defined capacity, delay and bit error rate, etc. An IP-CAN bearer in GPRS is a PDP context. |
| IP-CAN session: | Association between an UE and an IP network. The association is identified by a DE IP address together with an UE identity information, if available. An IP-CAN session incorporates one or more IP-CAN bearers. Support for multiple IP-CAN bearers per IP-CAN session is IP-CAN specific. An IP-CAN session exists as long as the UE IP address is established and announced to the IP network. |

The invention claimed is:

1. A method for handling policy and charging information relating to a user, the method carried out in a communications network comprising at least a first site and a second site, each of the first and second sites comprising at least a policy and charging rules (PCR) network entity, the method comprising: receiving, at the PCR network entity of the second site and from a first network entity of the first site, a request to obtain policy and charging information dependent on a user profile of a user accessing the communications network from the first site, wherein the request comprises at least an identity of the PCR network entity of the first site; if the user profile is not accessible at the PCR network entity of the second site: generating a redirection message based on the request, the redirection message comprising the identity of the PCR network entity of the first site, the identity of the PCR network entity of the second site, and an identity of a PCR network entity of a third site; and forwarding the redirection message to the first network entity of the first site; and if the user profile is accessible at the PCR network entity of the second site: sending a message indicating that the user profile is accessible at the PCR network entity of the second site from the PCR network entity of the second site to the first network entity of the first site and to the PCR network entity of the first site.

2. The method of claim 1, wherein the message comprises information identifying at least the PCR network entity in which the user profile is accessible.

3. The method of claim 1, wherein the user profile information is stored at the PCR network entity of the first site according to predetermined conditions.

4. The method of claim 1, further comprising receiving, at the first network entity of the first site, a request to handle a session for a user, wherein the user profile is associated to the user.

5. The method of claim 1, wherein the first network entity of the first site comprises a network entity including a policy and charging enforcement function.

6. The method of claim 5, wherein the request to obtain policy and charging information comprises a request to obtain policies corresponding to a user establishing a session with the first network entity of the first site.

7. The method of claim 6, further comprising determining a policy and charging decision at the PCR network entity of the second site based on the request and on the user profile.

8. The method of claim 1, wherein the first network entity of the first site comprises a network entity including an application function.

9. The method of claim 8, wherein the request to obtain the policy and charging information relates to an application offered by the network entity including the application function.

10. The method of claim 8, wherein the PCR network entity of the second site determines resources to assign based on the request to obtain the policy and charging information and on the user profile.

11. A policy and charging rules (PCR) network apparatus for handling policy and charging information relating to a user in a communications network, the communications network comprising at least a first site and a second site, the PCR network apparatus comprised in the second site, the PCR network apparatus comprising: a request receiving entity configured to receive a request message to obtain policy and charging information, the policy and charging information dependent on a user profile of a user accessing the communications network from the first site, wherein the request message further comprises at least an identity of a PCR network apparatus of the first site from which the request message has been redirected; a determining entity configured to determine a non-accessibility indication when the user profile is not directly accessible by the PCR network apparatus; a generating entity configured to generate, when the non-accessibility indication is determined, a redirection message based on the request message, the redirection message comprising an identity of the PCR network apparatus of the second site, the identity of the PCR network apparatus of the first site, and an identity of a PCR network apparatus of a third site; a forwarding entity configured to forward the redirection message to the first network entity of the first site when the non-accessibility indication is determined; and wherein the forwarding entity is further configured to forward, when the non-accessibility indication is not determined, an accessibility message indicating, to the first network entity of the first site and to the PCR network apparatus of the first site, that the user profile is accessible at the PCR network entity of the second site from the PCR network apparatus of the second site.

12. The PCR network apparatus of claim 11, further comprising: an information receiving entity configured to receive a message indicating that the user profile is accessible at the PCR network apparatus of the third site; and a storage entity to store, according to predetermined conditions, information indicating an association between user profiles and PCR network apparatuses on which corresponding user profiles are accessible.

13. The PCR network apparatus of claim 11, wherein the PCR network apparatus is further configured to determine, when the non-accessibility indication is determined, the identity of a PCR network apparatus of the third site from a reroute list indicating in which PCRF the user profile is available or from a list of PCRF available in the network.

14. The PCR network apparatus of claim 11, wherein: the request message comprises a plurality of identities, each of the identities referring to a different PCR network apparatus among a plurality of PCR network apparatus each comprised in a site different from the second site; and the forwarding entity is further adapted to forward the message to at least one of the plurality of identities.

15. A network apparatus having a policy enforcement function, the network apparatus comprised in a first site of a communications network comprising at least the first site and a second site, each of the first and second sites comprising at least a policy and charging rules (PCR) network apparatus, the network apparatus comprising a processor configured to: send a request to obtain policy and charging information to a PCR network apparatus comprised in the second site, the policy and charging information dependent on a user profile of a user accessing the communications network from the first site, wherein the request further comprises at least an identity of the PCR network apparatus of the first site from which the request has been redirected; receive a redirection message from the PCR network apparatus comprised in the second site, the redirection message comprising at least an identity of the PCR network apparatus comprised in the first site, an identity of the PCR network apparatus of the second site, and an identity of a PCR network apparatus comprised in a third site; and send a further request to obtain the policy and charging information to a PCR network apparatus of the third site, the further request comprising the identity of the PCR network apparatus comprised in the first site, the identity of the PCR network apparatus comprised in the second site and the identity of the PCR network apparatus comprised in the third site.

16. A method for handling policy and charging information relating to a user, the method carried out in a network entity having policy enforcement function, the network entity comprised in a first site of a communications network comprising at least the first site and a second site, each of the first and second sites comprising at least a policy and charging rules (PCR) network entity, the method comprising: sending a request to obtain policy and charging information to a PCR network entity comprised in the second site, the policy and charging information dependent on a user profile of a user accessing the communications network from the first site, wherein the request further comprises at least an identity of the PCR network entity of the first site from which the request has been redirected; receiving a redirection message from the PCR network entity comprised in the second site, the redirection message comprising at least an identity of the PCR network entity comprised in the first site, an identity of the PCR network entity of the second site, and an identity of a PCR network entity comprised in a third site; and sending a further request to obtain the policy and charging information to a PCR network entity of the third site, the further request comprising the identity of the PCR network entity comprised in the first site, the identity of the PCR network entity comprised in the second site, and the identity of the PCR network entity comprised in the third site.

17. A communications system for handling policy and charging information relating to a user in a communications network comprising at least a first site and a second site, the communications network comprising a policy and charging rules (PCR) network apparatus for handling policy and charging information relating to the user, the PCR network apparatus comprised in the second site, the PCR network apparatus comprising: a request receiving entity configured to receive a request message to obtain policy and charging information, the policy and charging information dependent on a user profile of a user accessing the communications network from the first site, wherein the request message further comprises at least an identity of a PCR network apparatus of the first site from which the request message has been redirected; a determining entity configured to determine a non-accessibility indication when the user profile is not directly accessible by the PCR network apparatus; a generating entity configured to generate, when the non-accessibility indication is determined, a redirection message based on the request message, the redirection message comprising an identity of the PCR network apparatus of the second site, the identity of the PCR network apparatus of the first site, and an identity of a PCR network apparatus of a third site; a forwarding entity configured to forward the redirection message to the first network apparatus of the first site when the non-accessibility indication is determined; and wherein the forwarding entity is further configured to forward, when the non-accessibility indication is not determined, an accessibility message indicating that the user profile is accessible at the PCR network apparatus of the second site from the PCR network apparatus of the second site to the first network apparatus of the first site, and to the PCR network apparatus of the first site.

18. The communications system of claim 17 further comprising in the first site a first network apparatus having a policy enforcement function.

19. The communications system of claim 18, wherein the first network apparatus having the policy enforcement function comprises one of a network apparatus including a policy and charging enforcement function and a network apparatus including an application function.

20. A computer program product stored in a non-transitory computer readable medium for handling policy and charging information relating to a user in a communications network comprising at least a first site and a second site, each of the first and second sites comprising at least a policy and charging rules (PCR) network entity, the computer program product comprising software instructions which, when executed on a programmable system, causes the programmable system to: receive, at the PCR network entity of the second site, from a first network entity of the first site, a request to obtain policy and charging information dependent on a user profile of a user accessing the communications network from the first site, wherein the request comprises at least an identity of the PCR network entity of the first site; if the user profile is not accessible at the PCR network entity of the second site: generate a redirection message based on the request, the redirection message comprising the identity of the PCR network entity of the first site, the identity of the PCR network entity of the second site, and an identity of a PCR network entity of a third site; and forward the redirection message to the first network entity of the first site; and if the user profile is accessible at the PCR network entity of the second site: send a message indicating that the user profile is accessible at the PCR network entity of the second site from the PCR network entity of the second site to the first network entity of the first site and to the PCR network entity of the first site.

\* \* \* \* \*

UNITED STATES PATENT AND TRADEMARK OFFICE
CERTIFICATE OF CORRECTION

| | |
|---|---|
| PATENT NO. | : 8,824,340 B2 |
| APPLICATION NO. | : 13/639896 |
| DATED | : September 2, 2014 |
| INVENTOR(S) | : Castro Castro et al. |

Page 1 of 4

It is certified that error appears in the above-identified patent and that said Letters Patent is hereby corrected as shown below:

On the Title Page, in item (57), under "ABSTRACT", in Column 2, Line 6, delete "(SI1O)" and insert -- (S110) --, therefor.

In the Specification

In Column 2, Line 13, delete "the a" and insert -- a --, therefor.

In Column 2, Line 16, delete "(TOP," and insert -- (TCP, --, therefor.

In Column 2, Line 19, delete "Data." and insert -- Data --, therefor.

In Column 2, Line 56, delete "UE-NAT" and insert -- UE-NAI --, therefor.

In Column 3, Line 53, delete "(s1)" and insert -- (S1) --, therefor.

In Column 4, Line 7, delete "(s1)" and insert -- (S1) --, therefor.

In Column 4, Line 29, delete "PRC" and insert -- PCR --, therefor.

In Column 6, Line 38, delete "OCR" and insert -- PCR --, therefor.

In Column 6, Line 52, delete "OCR" and insert -- CCR --, therefor.

In Column 7, Line 52, delete "FOR" and insert -- PCR --, therefor.

In Column 7, Line 54, delete "FOR" and insert -- PCR --, therefor.

In Column 7, Line 67, delete "FOR" and insert -- PCR --, therefor.

In Column 8, Line 1, delete "POP" and insert -- PCR --, therefor.

In Column 8, Line 6, delete "PRC" and insert -- PCR --, therefor.

Signed and Sealed this
Twenty-fifth Day of August, 2015

Michelle K. Lee
*Director of the United States Patent and Trademark Office*

In Column 8, Line 7, delete "PRC" and insert -- PCR --, therefor.

In Column 8, Line 12, delete "PRC" and insert -- PCR --, therefor.

In Column 8, Line 15, delete "PRC" and insert -- PCR --, therefor.

In Column 8, Line 17, delete "PRC" and insert -- PCR --, therefor.

In Column 8, Line 18, delete "PRC" and insert -- PCR --, therefor.

In Column 8, Line 20, delete "PRC" and insert -- PCR --, therefor.

In Column 8, Line 21, delete "PRC" and insert -- PCR --, therefor.

In Column 8, Line 22, delete "PRC" and insert -- PCR --, therefor.

In Column 8, Line 30, delete "PRC" and insert -- PCR --, therefor.

In Column 8, Line 32, delete "PRC" and insert -- PCR --, therefor.

In Column 8, Line 33, delete "PRC" and insert -- PCR --, therefor.

In Column 8, Line 46, delete "PRC" and insert -- PCR --, therefor.

In Column 8, Line 46, delete "such," and insert -- such --, therefor.

In Column 8, Line 55, delete "PRC" and insert -- PCR --, therefor.

In Column 8, Line 56, delete "PRC" and insert -- PCR --, therefor.

In Column 8, Line 59, delete "PRC" and insert -- PCR --, therefor.

In Column 8, Line 60, delete "PRC" and insert -- PCR --, therefor.

In Column 8, Line 62, delete "PRC" and insert -- PCR --, therefor.

In Column 8, Line 67, delete "PRO" and insert -- PCR --, therefor.

In Column 9, Line 1, delete "PRO" and insert -- PCR --, therefor.

In Column 9, Line 2, delete "PRC" and insert -- PCR --, therefor.

In Column 9, Line 4, delete "PRC" and insert -- PCR --, therefor.

In Column 9, Line 6, delete "PRC" and insert -- PCR --, therefor.

In Column 9, Line 8, delete "PRC" and insert -- PCR --, therefor.

In Column 9, Line 10, delete "PRC" and insert -- PCR --, therefor.

In Column 9, Line 11, delete "PRC" and insert -- PCR --, therefor.

CERTIFICATE OF CORRECTION (continued)
U.S. Pat. No. 8,824,340 B2

In Column 9, Line 12, delete "PRC" and insert -- PCR --, therefor.

In Column 9, Line 19, delete "PRC" and insert -- PCR --, therefor.

In Column 9, Line 26, delete "PRC" and insert -- PCR --, therefor.

In Column 9, Line 29, delete "PRC" and insert -- PCR --, therefor.

In Column 9, Line 32, delete "PRC" and insert -- PCR --, therefor.

In Column 9, Line 42, delete "PRC" and insert -- PCR --, therefor.

In Column 10, Line 20, delete "PRC" and insert -- PCR --, therefor.

In Column 10, Line 43, delete "PRO" and insert -- PCR --, therefor.

In Column 10, Line 47, delete "PRC" and insert -- PCR --, therefor.

In Column 10, Line 60, delete "PRC" and insert -- PCR --, therefor.

In Column 10, Line 63, delete "PRC" and insert -- PCR --, therefor.

In Column 10, Line 65, delete "PRO" and insert -- PCR --, therefor.

In Column 11, Line 1, delete "PRC" and insert -- PCR --, therefor.

In Column 11, Line 3, delete "redirection," and insert -- redirection --, therefor.

In Column 11, Line 4, delete "PRC network entity but at the PRC" and insert
-- PCR network entity but at the PCR --, therefor.

In Column 12, Line 27, delete "inserted the" and insert -- inserted in the --, therefor.

In Column 16, Line 20, delete "that" and insert -- then --, therefor.

In Column 17, Line 65, delete "PET" and insert -- PEF --, therefor.

In Column 19, Line 44, delete "according its" and insert -- according to its --, therefor.

In Column 19, Line 61, delete "PCRFS" and insert -- PCRFs --, therefor.

In Column 21, Line 9, delete "PCRF" and insert -- PCEF --, therefor. (1st occurrence)

In Column 21, Line 11, delete "PCRF" and insert -- PCEF --, therefor.

In Column 21, Line 22, delete "PCREs" and insert -- PCRFs --, therefor.

In Column 21, Line 31, delete "PCREs" and insert -- PCRFs --, therefor.

In Column 21, Line 62, delete "(Site 2-PCRF)" and insert -- (Site 2-PCRF). --, therefor.

CERTIFICATE OF CORRECTION (continued)
U.S. Pat. No. 8,824,340 B2

In Column 22, Line 2, delete "Site 2-PCRF" and insert -- Site 2-PCRF. --, therefor.

In Column 22, Line 4, delete "Site 1-PCRF" and insert -- Site 1-PCRF. --, therefor.

In Column 22, Line 21, delete "AR" and insert -- AF --, therefor.

In Column 22, Line 40, delete "AR in Site 1 receives an AR" and insert
-- AF in Site 1 receives an AF --, therefor.

In Column 22, Line 52, delete "(Site 2-PCRF)" and insert -- (Site 2-PCRF). --, therefor.

In Column 22, Line 56, delete "DR" and insert -- DB --, therefor.

In Column 22, Line 59, delete "Site1-PCRF" and insert -- Site1-PCRF. --, therefor.

In Column 26, Lines 1-20, delete "AF ........ IP network.".